United States Patent [19]
Lentink

[11] Patent Number: 6,081,643
[45] Date of Patent: Jun. 27, 2000

[54] WAVE GUIDES AND MATERIAL COMPRISING WAVE GUIDES AND ITS APPLICATION IN SCREENS

[76] Inventor: Willem Lentink, Henry Dunantlaan 77, Doetinchem, Netherlands

[21] Appl. No.: 08/713,045

[22] Filed: Sep. 12, 1996

Related U.S. Application Data

[62] Continuation of application No. 08/481,952, Jun. 7, 1995, abandoned, which is a continuation of application No. 08/324,274, Oct. 14, 1994, abandoned, which is a continuation of application No. 08/181,270, Jan. 13, 1994, abandoned, which is a continuation of application No. 07/408,511, filed as application No. PCT/NL88/00005, Feb. 18, 1988, Pat. No. 5,313,544.

[30] Foreign Application Priority Data

Feb. 18, 1987 [NL] Netherlands ............................ 8700403

[51] Int. Cl.$^7$ ................................ G02B 6/02; G02B 6/16
[52] U.S. Cl. ............................................. 385/123; 385/130
[58] Field of Search ...................................... 385/123, 130

[56] References Cited

U.S. PATENT DOCUMENTS

| | | | |
|---|---|---|---|
| 5,179,615 | 1/1993 | Tanaka | 385/132 |
| 5,313,544 | 5/1994 | Lentink | 385/123 |

*Primary Examiner*—Rodney B. Bovernick
*Assistant Examiner*—Robert E. Wise
*Attorney, Agent, or Firm*—Kenyon & Kenyon

[57] ABSTRACT

A wave guide or an assembly of wave guides, characterized in that each wave guide meets the conditions that: 1) at least one of the characteristics of the wave guide is of the same order of magnitude as the largest absolute value of the de Broglie wavelength $\lambda_b$ of a particle or a collectivity of particles moving or able to move through the wave guide; 2) the dimensions of the irregularities of the wall of the wave guide are small with respect to $|\lambda_c|$, the absolute value of the cutoff wavelength $\lambda_c$ of the wave guide, with the property that for each particle with de Broglie wavelength $\lambda_b$ that moves in the wave guide, holds $|\lambda_b| \leq |\lambda_c|$; and 3) $\lambda_c$ has a limited value, and can be found with the aid of the solutions of a relevant wave equation which has been solved by meeting fitting boundary conditions; in that, for the case of photons or luxons, the conditions is met that 4a) the relation between the wavelength $\lambda$ of the electromagnetic waves and the wavelength $\lambda_b$ of the de Broglie waves, which corresponds with these photons, is given by $\lambda = \lambda_b$; and that, for the case in which the particles are neither photons nor luxons the following conditions are met; 4b) that the energies of these particles are discrete and the physical phenomena in the wave guide and/or caused by the wave guide cannot be described in good approximation without using quantum mechanics, i.e. that the results of these calculations then do not exclusively correspond within 5% with the observations; wherein a characteristic dimension is the distance in between two neighboring pieces of boundary layer, between which a particle or a collectivity of particles can move, when $|\Psi|$, the absolute value of the wavefunction $\Psi$ of one particle or a collectivity of particles moving in the wave guide, as a function of the space coordinates, takes an constant value $|\Psi_k|$.

5 Claims, 17 Drawing Sheets

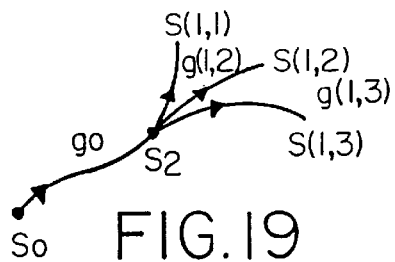
FIG. 19
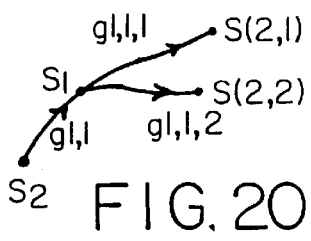
FIG. 20
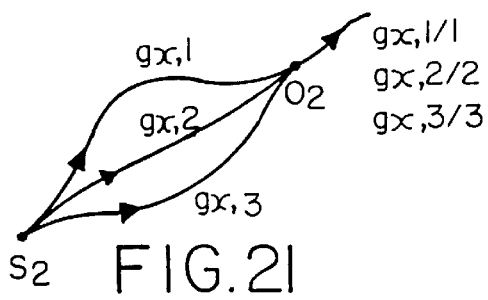
FIG. 21
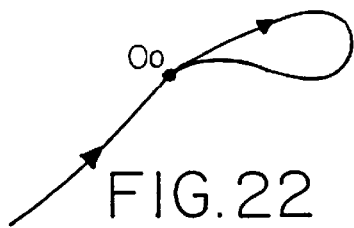
FIG. 22
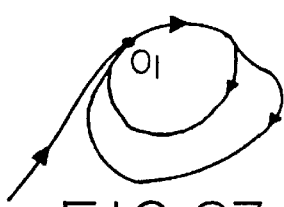
FIG. 23
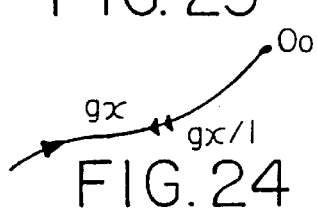
FIG. 24
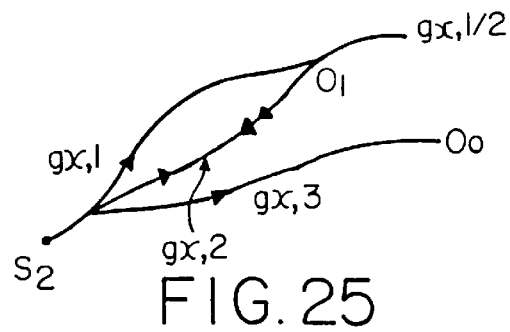
FIG. 25
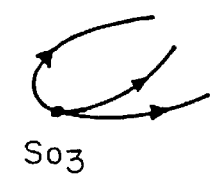
FIG. 26
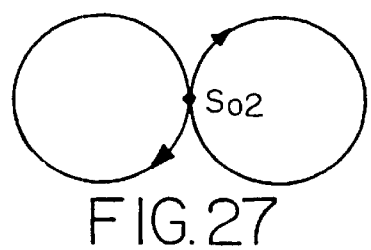
FIG. 27
FIG. 28
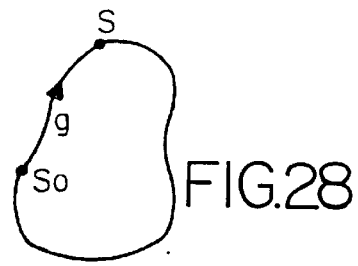
FIG. 29
FIG. 30

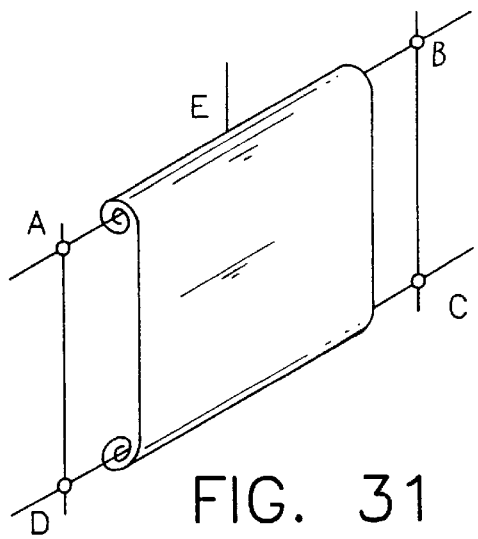
FIG. 31
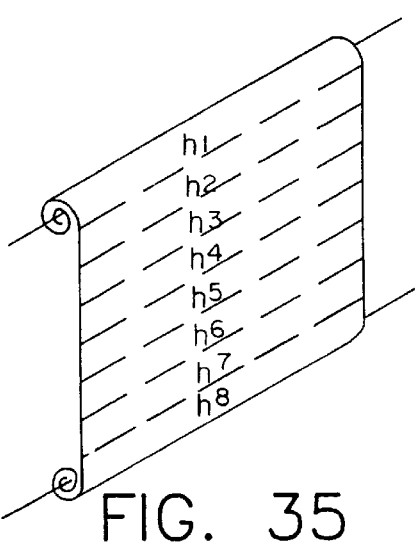
FIG. 35
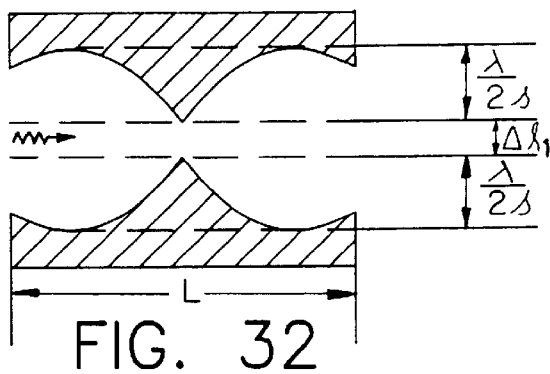
FIG. 32
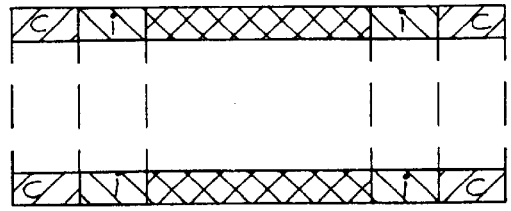
FIG. 36
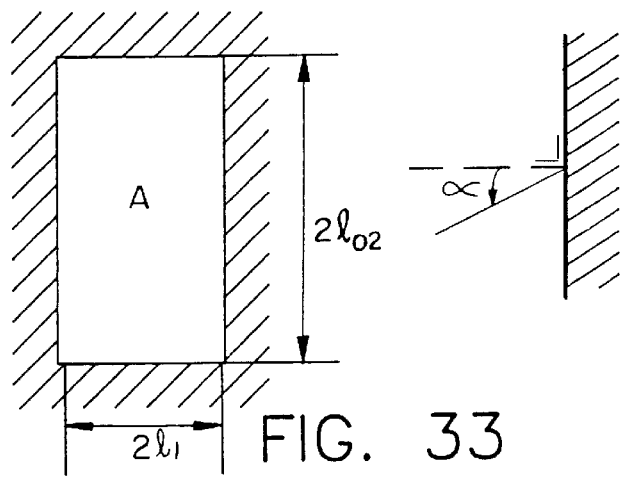
FIG. 33
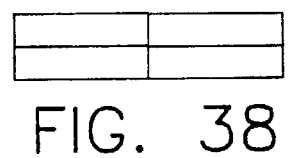
FIG. 37
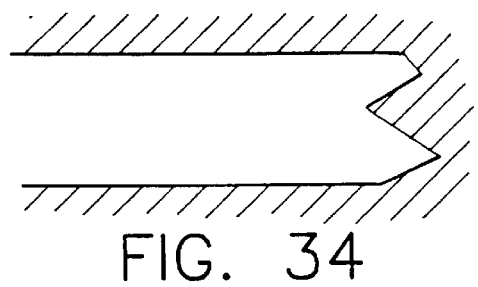
FIG. 34
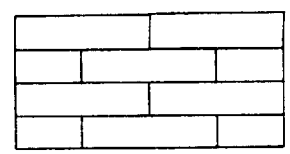
FIG. 38
FIG. 39

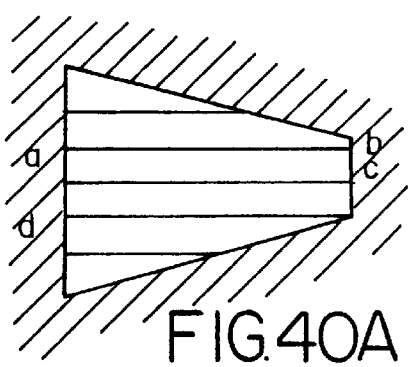
FIG.40A
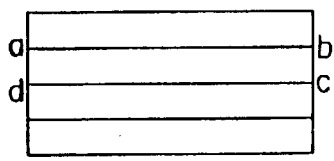
FIG.40B
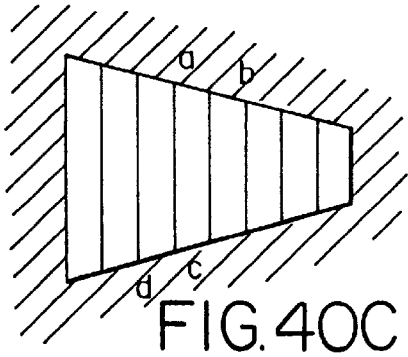
FIG.40C
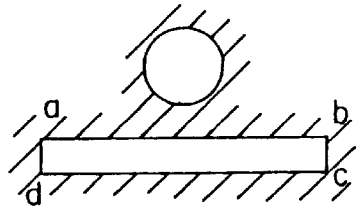
FIG. 40D
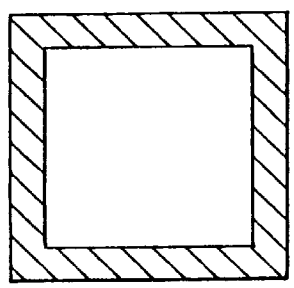
FIG. 41
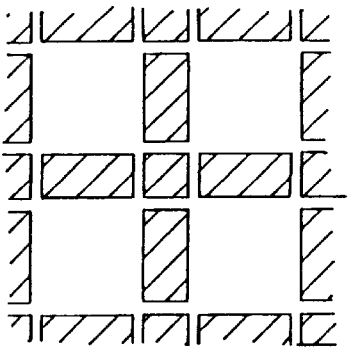
FIG. 42
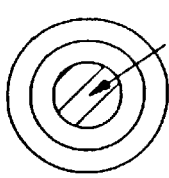
FIG.43A
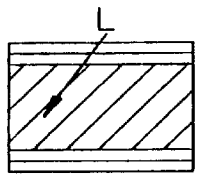
FIG.43B
FIG.43C
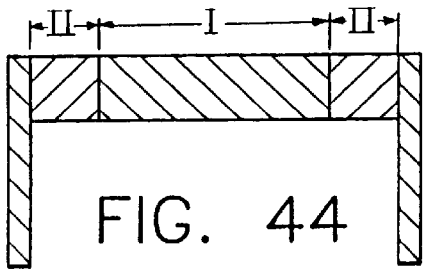
FIG. 44
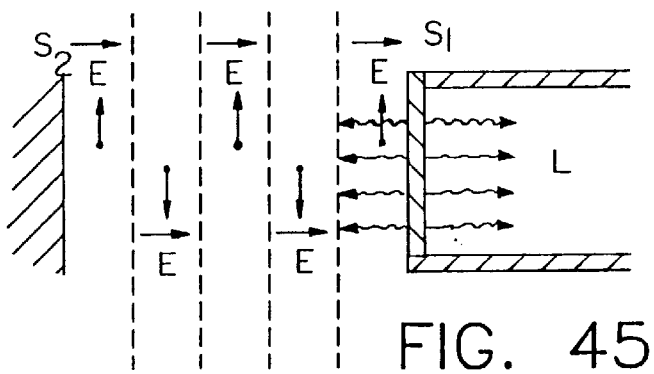
FIG. 45
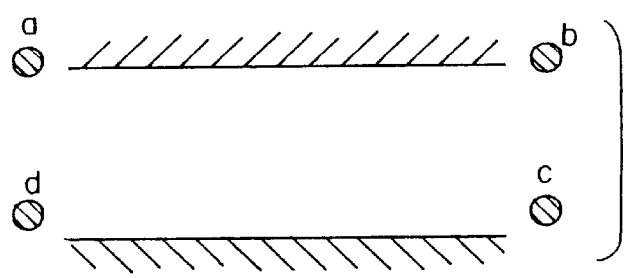
FIG. 46

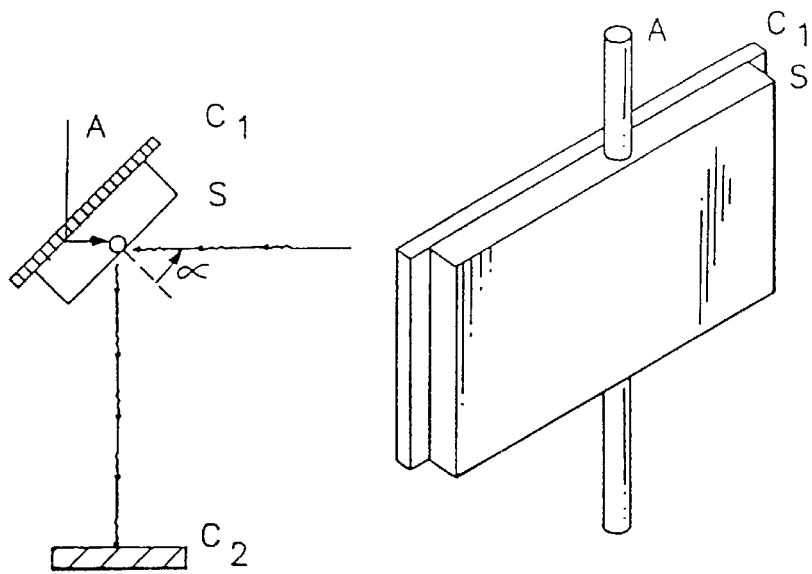
FIG. 51
FIG. 52
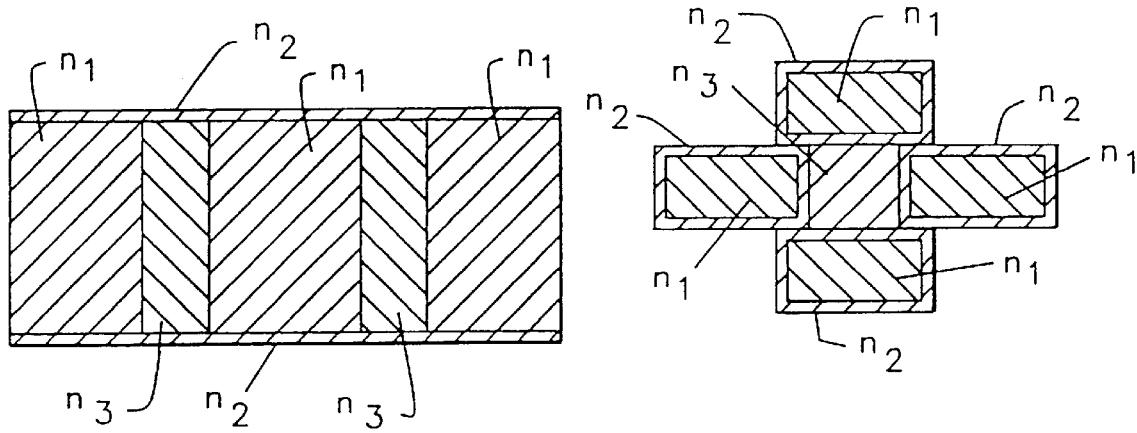
FIG. 53 A
FIG. 53 B
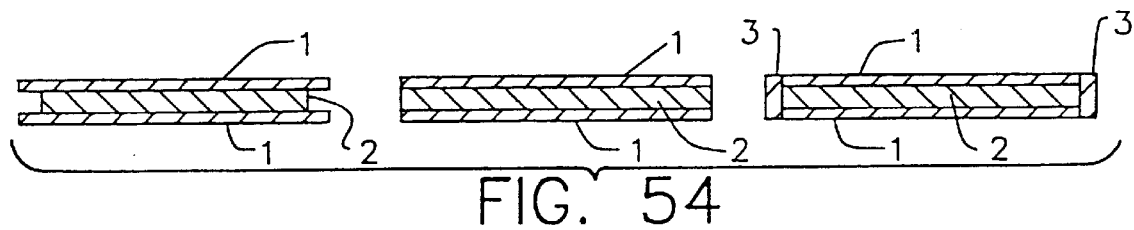
FIG. 54
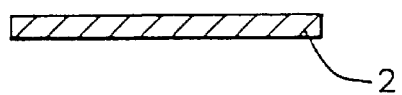
FIG. 55

| IDEAL GAS UNDER STANDARD CONDITIONS | $A_1$ | $C_u$ | $P_b$ | $P_t$ | $F_e$ |
|---|---|---|---|---|---|
| $a \times 10^9$ m  3.3 | 0.26 | 0.23 | 0.67 | 0.25 | 0.22 |

| | $\lambda_b \times 10^9$ m |
|---|---|
| PHOTON IN VACUUM = $6 \cdot 10^{14}$ Hz. | 500 |
| ELECTRON WHICH PASSES THROUGH 1eV FROM REST | 1.23 |
| ELECTRON IN BOLTZMANN-DISTRIBUTION UNDER STANDARD CONDITIONS | 6.43 |
| ELECTRON IN DEGENERATE FERMI GAS UNDER STANDARD CONDITIONS IN 3 DIMENSIONS | 5.38 |
| CONDUCTION ELECTRON IN $C_u$ AT 273 K; DEGENERATE FERMI GAS IN 3 DIMENSIONS | 784 |
| ATOMIC HYDROGEN IN 3-DIMENSION BOLTZMANN GAS AND 3-DIMENSION DEGENERATE FERMI GAS UNDER STANDARD CONDITIONS. | 0.15  $2.9 \times 10^{-3}$ |

FIG. 70

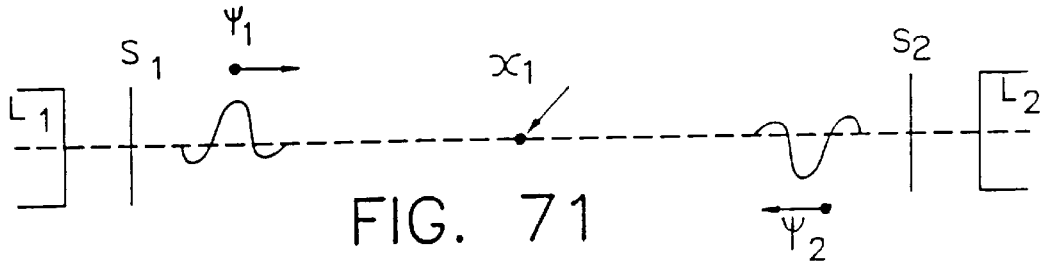

FIG. 71

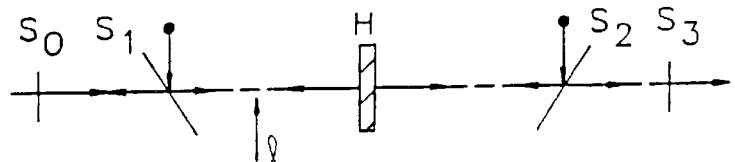

FIG. 72

WAVE GUIDES AND MATERIAL COMPRISING WAVE GUIDES AND ITS APPLICATION IN SCREENS

This application is a continuation of application Ser. No. 08/481,952, filed on Jun. 7, 1995 now abandoned which in turn is a continuation of application Ser. No. 08/324,274, filed Oct. 14, 1994 now abandoned which in turn is a continuation of application Ser. No. 08/181,270, filed Jan. 13, 1994 now abandoned which is a continuation of application Ser. No. 07/408,511, filed on Sep. 26, 1989, now U.S. Pat. No. 5,313,544, and which is a 371 of PCT/NL88/00005 filed on Feb. 18, 1988.

The invention concerns production means for the manufacturing of a wave guide, a bundle of wave guides, material consisting of wave guides, a screen consisting of wave guides together with the materials, the screens and the products which are made from these screens, or the above mentioned material. One of these products is a mirror with a very high reflectance. Mirrors with a somewhat lower reflectance are known form the literature.

A. F. Harvey states on page 236 of "Coherent Light", published by Wiley-Interscience in London in 1970, that mirrors with a high reflectance can be made by vapour deposition on a insulator of ¼-$\lambda$ layers of two dielectric media with different refractive indexes. Such multilayer mirrors do have the following 5 disadvantages:

1) Their bandwidth is limited. Harvey comments: Let $n_i$ be the refractive index of a layer of medium i and $\Delta\lambda$ the width of the band, at a distance of the media 1 and 2 of (¼)$\lambda$, $\Delta\lambda/\lambda=(4/\pi)$ arc sin $\{(n_1-n_2)/(n_1+n_2)\}$ yields. The bandwidth can be enlarged by varying the thickness of the layers. Harvey gives as an example the fact that a multilayer mirror consisting of 35 layers, in the wavelength domain 300 nm$\leq\lambda\leq$830 nm, can have a reflectance greater than 0.9.

2) The power that these mirrors absorb is too much for some applications e.g. in high power lasers.

3) They do not reflect exclusively according to Snellies' law and thus scattering of light occurs.

Harvey gives as an example a 15 layer mirror designed for a wavelength of 1.06 $\mu$m, which transmits 0.05%, reflects 99.34% and absorbs or scatters about 0.6%. Jeffrey W. Griffin et al show in Applied Optics (see vol 25, no.10, page 1532, 1986), that the scattering arises from two sources which cause surface scattering and volume scattering respectively. They state that volume scattering increases with the number of layers and they mention a 15 layer mirror, designed for a wavelength of 0.633 $\mu$m having a reflectance of 99% and a volume scattering of 1%. Therefore in practice the reflectance as a function of the number of layers has a maximum which is smaller than 1.

4) They do not have a sharply determined cutoff wavelength. Therefore it is impossible to use these mirrors e.g. to cut off the spectrum of Nd-YAG laser in such a way that a smaller domain of the spectrum would be available in order to sharpen the focus of the Nd-YAG laser light.

5) Their applicability with respect to short wavelengths is limited due to the fact that at a certain wavelength the reflective ability of the normal reflection decreases as a function of the frequency.

The said invention, in most cases, does not have these disadvantages, or if so, to a lesser degree. E.g. the wavelength domain having a high reflectance is not limited to the upper side but limits itself to the lower side. There, the boundary is so sharp that it can be characterized by a cutoff wavelength, $\lambda_c$, and can be used e.g. to narrow the spectrum of a Nd-YAG laser. The power P absorbed by the mirror is considerably less than the power $P_c$ absorbed by a conventional multi-layer mirror. For a certain design of the mirror it is possible to estimate the magnitude of P with the help of $P_c$.

Let $A_e$ be the surface area of the unit cell of the mirror and $A_r$ the surface area of the rim of the unit cell of the mirror: $P \leq (A_r/A_e) \cdot P_c$ is yielded.

A comparable relation holds also for $P_s$; the power of the light that has been scattered by the mirror and $P_{cs}$ the power of the light that has been scattered by a conventional multi layer mirror. In some cases, depending upon the wavelength of the incident photons, it is realized that $A_r/A_e \leq 10^{-2}$ holds true. The field of application of the invented mirror is at the short wavelength side less limited than those of the metallic mirror and the multi layer mirror respectively. In the first case, this is caused by the fact that the reflectance is maximum at a 90° angle of incidence and in the second case it is caused by the fact that a less normal reflectance is mainly apparent at the outer wall, on the rim of the unit cell. The said invention is a mirror consisting of various cells which either may or may not be of the same type.

If a mirror consists of a great number of identical cells then such a cell is called a unit cell. In practice a unit cell is built of at least two media whereof at least one corresponds with a wave guide. Such waveguides either may or may not be closed at one side and their length is at least equal to half of their cutoff wavelength $\lambda_c$, and preferably much longer than $\lambda_c$. The cutoff wavelength is defined as the largest wavelength of the radiation that can be transmitted by the waveguide. In order to prevent that the waves penetrate practically through the material within the wall of a waveguide, such a waveguide must have a length which is at least equal to five times the penetration depth $6_o$ of the material of which the wall of the waveguide consists. The penetration depth is defined in a longitudinal section of a wave guide. It is the distance from a point p in the wall of a waveguide to the inner surface of the wall of the waveguide. In point P the absolute value of the wave function $\Psi$ of a photon transmitted by the waveguide has a value which is (1/e) times its value on the inner surface of the wall of the waveguide.

BRIEF DESCRIPTION OF THE DRAWINGS

FIGS. 1A–1N show examples of cross sections of cells that may be unit cells in which a medium 1 having a refractive index $n_2$ is situated in the center of a cross section of the cell, while medium 2 having refractive index $n_2$ is situated at the rim of that cross section coinciding exactly with the wall of the cell.

FIGS. 19 and 20 are illustrations showing examples of splittingpoints.

FIG. 21 is an example of a sink of the second order.

FIG. 22 shows an insertionpoint of zero order that is antiparallel.

FIG. 23 shows an insertion point of the first order that is parallel.

FIG. 24 shows a reflecting growing line.

FIG. 25 shows are absorbed growing line.

FIG. 26 shows a source point of the third order.

FIGS. 27–30 show examples that can be related to an n-fold closed growing line as well as to a definitely closed growing line.

FIG. 31 shows a sail consisting of wave guides or cavities to be used, e.g., on a space sonde to propel that sonde with the help of electromagnetic radiation emitted by the sun.

FIG. 32 shows a longitudinal section of a unit cell of a phase dependent mirror.

FIG. 33 shows a cross section of a unit cell of a phase dependent mirror.

FIG. 34 shows an arbitrary example of a longitudinal section of the inner wall of the cavity of a unit cell in which a diffuse reflector is situated.

FIG. 35 is an example of a radiation selective screen, consisting of areas each having its own cutoff wavelength.

FIG. 36 shows a longitudinal section of a unit cell in which conducting and insulating layers are deposited in a symmetrical construction.

FIG. 37 shows the angle of incidence determining the effective cutoff wavelength of a wave guide in a radiation selective screen.

FIG. 38 shows a piling of unit cells according to a so-called β-brick connection, where β=0.

FIG. 39 shows a piling of unit cells according to the β-brick connection, where β=1.

FIG. 40 shows five types of cross sections of a storage ring for highly energetic particles in accordance with the invention.

FIG. 41 shows a cross section of a part of a unit cell of H-mawag having no grooves to reduce the emittance.

FIG. 42 is an example of an outer surface of a unit cell that does not radiate as a black body but rather so that the spectrum of the emitted radiation can partly be characterized by a cutoff wavelength, which is dependent upon the thickness of the grooves in the wall of the unit cell.

FIG. 43 is an illustration of screens placed parallel behind one another to enhance the insulating effect of a thermal insulator.

FIG. 44 is an example of a glow screen according to the invention.

FIG. 45 illustrates parallel neighboring domains in which the direction of the electric field is opposite as a part of an accelerator for electrically charged particles.

FIG. 46 is an example of a cross section of the boundary of the inner wall of a cavity in the H-mawag of an artificial atom or ion according to the invention.

FIG. 51 is a longitudinal section of a spectrometer according to the invention.

FIG. 52 is a part of the spectrometer of FIG. 51 shown in perspective.

FIGS. 53A–53B show two examples of a special kind of piling in which spaces are formed between the piled wave guides that can also be considered as wave guides.

FIG. 54 shows some construction forms of a cross section of the hot joint of a thermoelectric cell of the invention.

FIG. 55 shows another construction form of a cross section of a cold joint.

FIG. 70 is a table relating de Broglie wavelengths with nearest neighbor distances of atoms in idealized cubic crystals.

FIG. 71 is an illustration of a situation in which the chance of frequency duplication is different from zero.

FIG. 72 shows a method of enhancing the chance of frequency duplication.

In a certain kind of unit cell, the simple unit cell medium 1 having refractive index $n_1$ is situated in the center of a cross section of the cell, while medium 2 having refractive index $n_2$ is situated at the rim of that cross section coinciding exactly with the wall of the unit cell. Two kinds of simple unit cells are distinguished; type 1 being characterized by $n_1 > n_2$ and type 2 by $n_2 > n_3$. Composed unit cells are also distinguished. Such a unit cell has the property of having at least two different waveguides.

Figure 1:
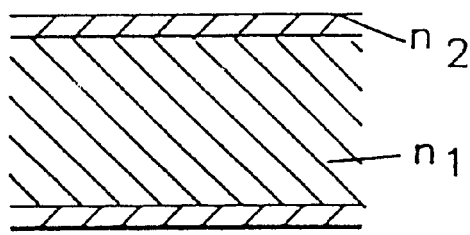
FIG. 1 shows some and by far not all of the possible examples of cross sections of unit cells. If it is, for whatever reason, important, e.g. to reduce costs, to minimize the amount of material of medium 2 then it is of advantage to make a cross section of both the outer periphery and the inner periphery of a unit cell, and that the boundaries of medium 2 both should coincide with a regular hexagon.
Figure 1:
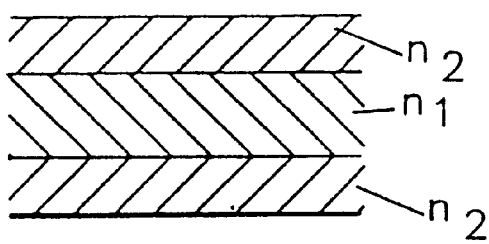
Figure 1:
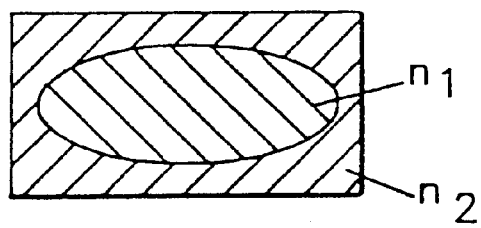
Figure 1:
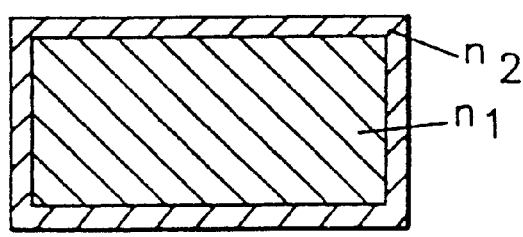
Figure 1:
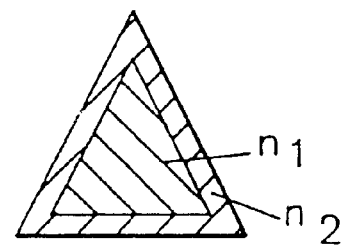
Figure 1:
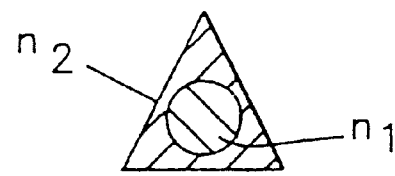
Figure 1:
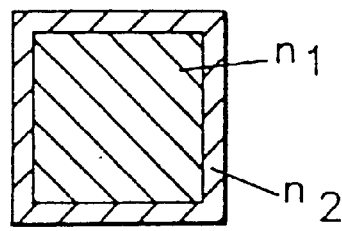
Figure 1:
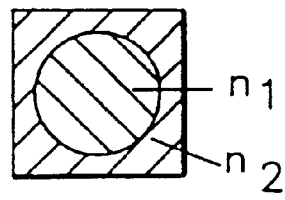
Figure 1:
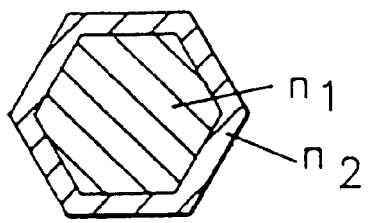
Figure 1:
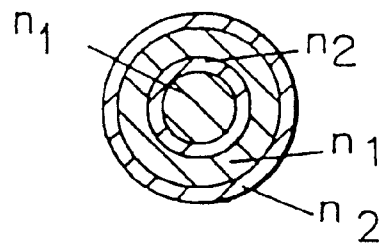
Figure 1:
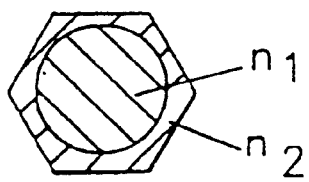
Figure 1:
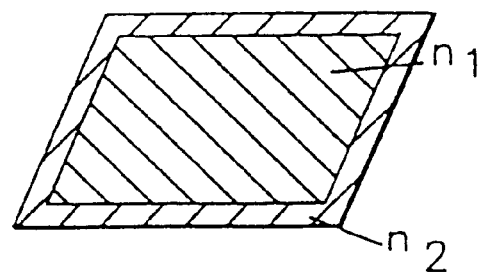
Figure 1:
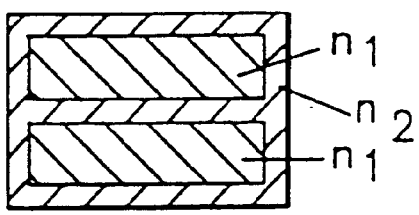
Figure 1:
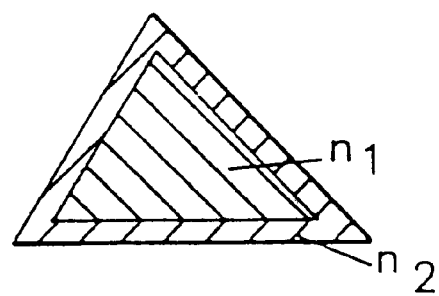

The unit cells shown in the FIGS. 1.1 through 1.10 and 1.13 and 1.14 are all simple unit cells having the same property; in a cross section of the unit cell the periphery of medium 1 has either precisely 1, or precisely 2 or an infinite amount of points in common with a straight line.

Such unit cells are of importance for applications because in a cross section, the whole of medium 1 can be associated with exactly one cutoff wavelength. These cells are called specific unit cells.

The unit cells in the FIGS. 1.2, 1.11 and 1.12 are all composed unit cells. The unit cell in FIG. 1.2 is an example of a unit cell having characteristic dimensions of 0.5 $\lambda_{ci}$, where $\lambda_{ci}$ is the cutoff wavelength in medium i. With the proper design, a mirror consisting of such unit cells is suitable to reflect all electromagnetic radiation of wavelength $\lambda$ provided that $\lambda > \lambda_{ci}$ holds.

Conventional multi layer mirrors have structures of characteristic dimensions of 0.25 $\lambda_i$ where $\lambda_i$ the wavelength of the light in medium i in the mirror. In practice $\lambda_{ci} \approx \lambda i$ holds. Therefore, the said invention can be made with greater precision than the corresponding conventional multi layer mirror, while the lower boundary of the wavelength domain is considerably lower than that of the conventional multi layer mirror. The unit cell shown in FIG. 1.11 can be used to make mirrors which allow for e.g. fifty percent transmittance. For instance, one waveguide can be used to transmit light while another waveguide is designed to reflect light. This unit cell is an example of a unit cell with more than 1 characteristic dimension. Mirrors consisting of various kinds of unit cells also belong to the invention.

Figure 2:
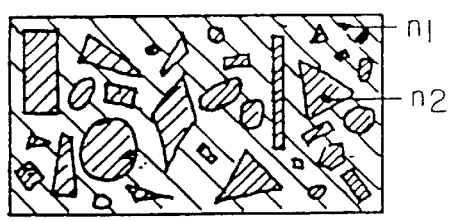
FIG. 2 is an example of a cross section of a mirror consisting of various kinds of unit cells.

Each cell corresponds with exactly one waveguide. In FIG. 2 an example of a cross section of such a mirror is shown. This cross section consists of the media 1 and 2. All the waveguides correspond with medium 2. They are so to say imbedded in medium 2. In order to operate as a mirror the condition $n_1 \neq n_2$ must be apparent.

Certainly this example is not the most general one, since medium 2 has a structure in the cross section of the mirror. Each straight line, having at least one point in common with the periphery of a waveguide, has either precisely one, precisely two or an infinite amount of points in common with that periphery. If light of wavelength $\lambda$ enters this mirror from a vacuum at normal incidence then the reflectance of the mirror is independent of the space coordinates, provided the following conditions are met:

1) $n_2\lambda > \lambda_{c12}$ where is the greatest cutoff wavelength of a waveguide of the mirror.

2) If in a cross section of the mirror, the boundaries between the medias of 1 and 2 are constant and medium 1 and medium 2 are exchanged then the cutoff wavelength $\lambda_{c21}$ of the new mirror obeys $(n_1/n_2).\lambda_{c21} < \lambda$.

Figure 3:
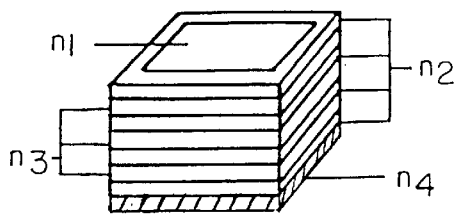
FIG. 3 is an example of a unit cell that can be considered as a variant of the simple unit cell.

Mirrors consisting of unit cells which can be considered as variants of the simple unit cell belong also to the invention, provided that medium 2 is replaced by a multilayer of media 2 and 3 and if desired a layer of medium 4, where the thicknesses of the layers meet $n_2\Delta l_2 = n_3\Delta l_3 = 0.25\lambda n_3$ ($\lambda$ is the wavelength in vacuum of the light that has to be reflected). Medium 4 has the function to bear the media 1, 2 and 3. An example of such a unit cell is shown in FIG. 3. It is a variant of the unit cell in FIG. 1.7. Such a unit cell serves as a model for relations of the type $P \leq (A_r/A_e).P_c$ which are used to compare both the absorbed power of a mirror designed according to this invention and the scattered power of the mirror with the absorbed power, respectively scattered power of a conventional multi layer mirror. An advantage of the said invention is that a unit cell can be constructed in such a way so that it is closed at one side. This side can be used to remove the heat generated in the media 1, 2, 3 or 4. Because of the heat transported by radiation it is advantageous to build the closed sides of the waveguides out of material that radiates as a black body or has a very high emissivity. If the mirror is used to reflect monochromatic radiation only, absorption will occur only at the surface area $A_r$ of a unit cell.

The quotient $A_k/A_a$ of the surface $A_k$ of the unit cell, located at the closed side of the waveguide that radiates absorbed energy and the surface $A_a$ of the unit cell, located at the open side of the waveguide, that absorbs radiation that was meant to be reflected, yields $A_k/A_a \geq 1 A_c/A_r >> 1$. For both a metal mirror and a multi layer mirror, $A_k/A_a = 1$ yields, causing the latter mirrors to be more sensitive to thermal damage. The media which are used for the construction of the invention can be solids, liquids, gasses, vapours, plasmas or vacuo. When liquids are used, e.g. these liquids can be situated, in a container which is transparent. An example of a cross section of a unit cell of such a mirror is shown in FIG. 1.1. Feasible liquids are those liquids which do not mix, have slightly different densities, have a high mutual difference in refractive index and absorb a neglectible part of the radiation that is to be reflected. Finally it has been stated that it is possible to pile identical unit cells. One of the piling methods, but certainly not the only one, is a piling according to a so called "β-brick connection", where β yields $0 \leq \beta < 1$. Cross sections of two waveguide cables are shown in the figures. FIG. 38 shows the case β=o while FIG. 39 shows the case β=1.

There is a special kind of piling when spaces are formed between the piled waveguides, which also can be considered as being waveguides themselves. FIG. 53 shows two examples which are each related to a part of a cross section of a cable that consists of waveguides. There we have a generalization of a "β-brick connection" piling. These methods can be used to save material that is of importance in space travel.

A second advantage is that it is possible to choose the refractive index $n_3$ of the clearances equal to 1. That way those clearances can transport information as fast as possible.

The Above Mentioned Invention Can Be Generalized as Follows

The invention concerns the manufacturing and applications of a waveguide, a bundle of waveguides, material made from waveguides, screen(s) consisting of waveguides and products made from the above mentioned waveguide(s), material and screen(s). A waveguide in the sense of the invention is understood as being a conductor of particles in the widest sense which has from the below mentioned properties, 1), 2), 4), 5) and 6), if the waveguide conducts photons along with the properties 1), 2), 3), 5) and 6) if it conducts particles which are neither photons nor luxons. The properties 1) through 6) are:

1) At least one of the characteristic dimensions of the waveguide is of the same order of magnitude as the greatest absolute value of the de Broglie wavelength $\lambda_c$ of a particle or a group of particles, which can be conducted by the waveguide.

2) $\lambda_c$ has a bounded value and can be found with help from the solutions of a relevant wave equation, which has been solved under fitting boundary conditions.

3) If the waveguide conducts particles which are not luxons, then the energies of these particles are discrete while the physical phenomena in the waveguide, or those caused by the waveguide, or those which are jointly caused by the waveguide, can not be described with adequate approximation without the use of quantum mechanics. That means that the relative difference between these calculations and observations should be less than 5 percent.

4) the relation between the wavelength λ electromagnetic waves in the said wave guide and the wavelength $\lambda_b$ of those of de Broglie which correspond with photons, is given by $\lambda=\lambda_b$.

5) The dimensions of the unevenness of the wall of the wave guide are small in comparison with $|\lambda_c|$.

6) The length of a wave guide is equal to or greater than the maximum of $\lambda_c/2$ and 5 times the penetration depth of the wave in the wall of the wave guide, and preferably much longer. Both electromagnetic radiation, or photons and lattice vibrations in solids, or photons are considered as consisting of particles.

The unique elements in the above mentioned definition are the restrictions which lead to the fact that a wave guide, in the sense of the invention, has one or more dimensions which cause phenomena next to or in the wave guide to occur which can only be described with reasonable approximation by using quantum mechanics. For instance, without these restrictions all conductors or semiconductors of electricity and all conductors of liquids, gases plasmas and photons could be considered as being a waveguide if they would conduct particles. The material that consists of wave guides in the sense of the invention is called mawag. That name is an abbreviation of matter wave guide. At least three kinds of mawag are defined, namely: H-mawag, M-mawag and C-mawag. H is an abbreviation of hole, M of massive and C of composite. C-mawag consists of at least two of the following three materials, no mawag, M-mawag and H-mawag.

The media that can be used for the construction of mawag can be solids, liquids, vapours, gases, plasmas and vacuo.

H-mawag is constructed of exactly one basic material wherein one or more cavities are situated. At least one characteristic dimension is of the same order of magnitude as the greatest absolute value of the de Broglue wavelength, of a particle that either move or can move, or a group of particles that either move or can move through the H-mawag. A characteristic dimension is for instance the constant distance $d_1$ between two neighboring layers of the same kind between which a particle could be found or the minimum distance $d_2$ of two non coinciding parallel lines which are both tangent to a curve K which coincides with a curve upon which $|\Psi|$, the absolute value of the wave function $\Psi$ of either a particle or a group of particles being in the wave guide, has a constant value $|\Psi_k|$.

$|\Psi|$ can be used to show which conditions have to be met at the boundary of the wave guide in order to use the concept of cutoff wavelength meaningfully. This is achieved as follows. Let $|\Psi_o|$ be the maximum of $|\Psi|$, $|\Psi_r|$ be either the absolute minimum or the smallest relative minimum of $|\Psi|$. Then the concept of cutoff wavelength can be used meaningfully in a closed two dimensional region if the condition $\ln(|\Psi_r|/|\Psi_o|) \leq -5$ is met there.

The length of a wave guide should be at least equal and preferably much greater than half of the cutoff wavelength. In the chapter: "The topology of mawag", the concept of length of an unbifurcated wave guide in the sense of the invention is dealt with. That length is equal to the absolute value of the growing line of an unbifurcated cavity between the points $S_o$ and $S$.

The relationship between the cutoff wavelength $\lambda_c$, being defined as the largest of the de Broglie wavelengths of either a particle or a group of particles that moves or can move through the wave guide, and a characteristic dimension, as for instance, $d_1$ or $d_2$, is found by solving the relevant wave equation, while meeting the boundary conditions. Thereto it is of importance to know if $\Psi$ describes the behavior of either one or more bosons or the behavior of one or more fermions. Bosons and fermions being particles which spin, can be represented with the help of whole numbers, respectively the help of the halves of whole numbers. Bosons have symmetric wave functions while fermions have antisymmetric wave functions.

For large values of R, the distance to the point of symmetry, symmetric wave functions, $\Psi_s$, are proportional with cos (kR). For large values of $R_a$, the distance to the point of anti-symmetry, anti-symmetric wave functions, $\Psi_a$, are proportional with sin ($kR_a$).

The importance of the distinction between fermions and bosons is, for instance, expressed in the calculation of the cutoff wavelength $\Psi_c$ of a wave guide consisting of two parallel plates of a medium having a refractive index $n_2$, between which a medium having refractive index $n_i$ is situated. Let $d_1$ be the distance between these parallel plates, then in the limit $|n_1/n_2| \to 0$ in case the particle or the group of particles moves between the plates we see that $\lambda_c=d_1$ holds if the particle is a fermion, while $\lambda_c=2d_1$ holds if the particle or the group of particles is a boson. If limit $|n_1/n_2| \to 0$ then $\lambda_c>d_1$ if fermions are moving through the wave guide while $\lambda_c>2d_1$ if bosons are moving through the wave guide.

M-mawag is constructed of exactly one basic material wherein no cavities of the kind specified for H-mawag are present. That material has at least one characteristic dimension of the same order of magnitude as the greatest absolute value of the de Broglie wavelength $\lambda_b$, of either one particle or a group of particles moving in the basic material.

C-mawag is constructed of at least two kinds of basic materials. If C-mawag consists of exactly two basic materials, the materials I and II, various cases can occur which can be coded as $C_{ij}$, where i is related to material I and j to material II. Both i and j can correspond with each of the values 1, 2 and 0 with the exception of the case i=j=o, because it is not related to any kind of mawag. The code reads, 1 corresponds with H-mawag, 2 with M-mawag and 0 with neither H-mawag nor M-mawag. Thus, the $C_{ij}$-mawag that has been designed to use exclusively the properties of one kind of particle in one material, is characterized by the product i×j that yields i×j=o. On the other hand, $C_{ij}$-mawag that has been designed to use the properties in the particles of both materials is characterized by the product i×j that yields i×j≠o.

Material which is not mawag is called bulk material. The properties of bulk materials are known for a great part and are, for instance, described in the "Handbook of Chemistry and Physics", published by the CRC Press Inc. in Cleveland Ohio. Editor of the 57-th edition of 1976 is Robert C. Weast. The unique feature of mawag can be demonstrated most easily with H-mawag which is situated in a vacuum. That will be done below.

After that similar consideration about both M-mawag and C-mawag will be trivial.

When we consider the thermal emission spectrum of the basic material which is used to make H-mawag, we may see a spectrum obeying Planck's law, while the cavities in the H-mawag are characterized by a cutoff wavelength $\lambda_c$ in such a way that for $\lambda > \lambda_c$, no radiation of wavelength $\lambda$ can be emitted from the cavities. By analogue, depending on the design of the material, the phononspectrum of H-mawag can differ strongly from the phononspectrum of the bulkmaterial, which consists of the same kind of molecules as H-mawag. In this way, at a proper design, all thermodynamic properties of H-mawag will differ from those of the bulk material that consists of the same molecules as the H-mawag.

According to page 226 of Harvey's "Coherent Light" mawag is known as a wave guide for electromagnetic waves. As such, it is not yet, known as a mirror.

In the form of a screen or in any other form, mawag can, depending on the design of the material, be applied as a semi-permeable membrane, dust filter and a screen with spectral selective properties, a catalyst of chemical processes, low loss conductor of electric currents, low loss conductor of electromagnetic radiation, diffuser for flows of particles, thermal insulator, material with a low work function, low loss conductor of heat flows, material with a low specific heat, vapourization triggering screen and combinations of these applications. It is also possible with the help of H-mawag to situate, solids, gases, liquids, vapours and plasma's in the cavities of one or two dimensional H-mawag with the effect that their thermodynamical and chemical properties become different from those of bulkmaterial. Chemical reactions carried out with mawag as well as chemical reactions which take place in H-mawag can give rise to materials which either cannot be made otherwise or cannot be made so economically.

H-mawag can be used to make M-mawag with methods which are known from physics. One such methods is discussed herein. Depending of the atomstructure or the molecular structure of the wall of the mawagmaterial, mawag can also be used for the manufacturing of metallic glasses or the growing of crystals. These methods and properties can be used in a great number of ways in technics. The invention concerns all applications of mawag. A restricted number of applications, certainly not all are discussed in this patent application. Below the following issues will be treated: 1) Topology of mawag. 2) Manufacturing of mawag. 3) Some applications of mawag.

In general, the inventions described in the chapter "Some applications of mawag", can be generalized by allowing the walks of the waveguides described in that chapter either to coincide or partly coincide with the wall of either a fermion cavity or a boson cavity.

1) The Topology of Mawag

The topology of mawag has already partly been treated on the pages 8 through 11. For the other part it is sufficient to describe only the H-mawag. That can be seen as follows.

Firstly, C-mawag contains H-mawag or M-mawag. Secondly, a kind of M-mawag that consists of a solid can be obtained by filling the cavities of H-mawag with a solid in liquid form. Then by cooling the cavities they are able to be filled with a solid. Next, the M-mawag can be obtained by removing the walls of the former cavities with either physical or chemical methods.

Figure 5:
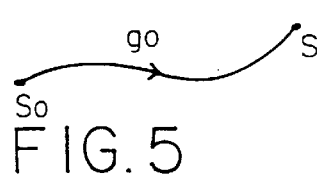
FIG. 5 shows the temporary endpoint of an unbifurcated growing line.
Figure 6:
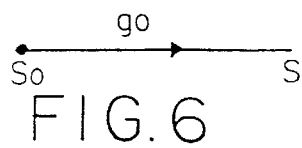
FIG. 6 is an illustration of a straight growing line.
Figure 7:
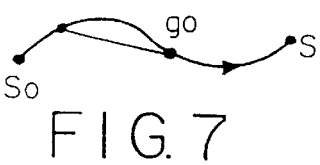
FIG. 7 is an illustration of a curved growing line.

The shape of a cavity in H-mawag can be described as follows. It is an unbifurcated cavity that can be characterized by the unbifurcated growing line $g_o$ of the cavity, the orientated direction line segment $\vec{1}_o$ of the cavity, the shape of the cross section A of the cavity, the position of the orientated basis line segment $\vec{1}$ that is situated in A and is fixed with respect to A while it has point S in common with $g_o$, and with the condition that in the startingpoint $S_o$ of $g_o$ the line segment $\vec{1}$ is parallel to $\vec{1}_o$ and coincides with $\vec{1}_o$. An unbifurcated growing line $g_o$ has the property that the center of gravity of the boundary of A coincides with S. (See FIG. 4). The point S is called the temporary endpoint of $g_o$. (See FIG. 5). We distinguish straight growing lines, curved growing lines, bifurcated growing lines and unbifurcated growing lines. A growing line is straight when it coincides with half of a straight line or with a straight line segment. (See FIG. 6). A growing line is curved if there exists a straight line segment where upon exactly two points of the growing line are situated. (See FIG. 7). Let $g_o(t)$ be the length of the path of point S when it, starting in point $S_o$, moves along $g_o$. A point on $g_o$ can then be described by $g_o(t_1)$, provided $o \leq t_1 \leq t$. Thus $g_o(o)\phi S$, and $g_c(t)\phi S$. $|g_o(t)|$ is called the length of the unbifurcated wave guide of which $g_o$ is the growing line. The left tangent $R_1$ in the point $g_o(t_1)$ is defined as the limit line of a bundle of connection lines of $g_c(t_1-\Delta t)$ and $g_o(t_1)$ when $\Delta t \geq o$ and the limit $\Delta t \downarrow o$ is taken.

Figure 8:
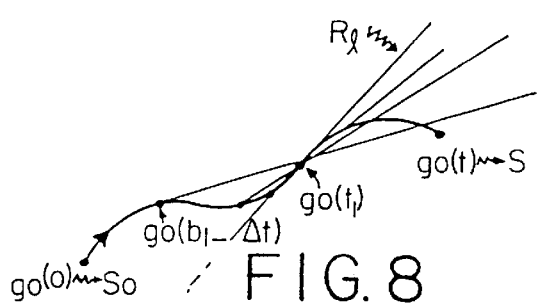
FIG. 8 is an illustration of a left tangent.
Figure 9:
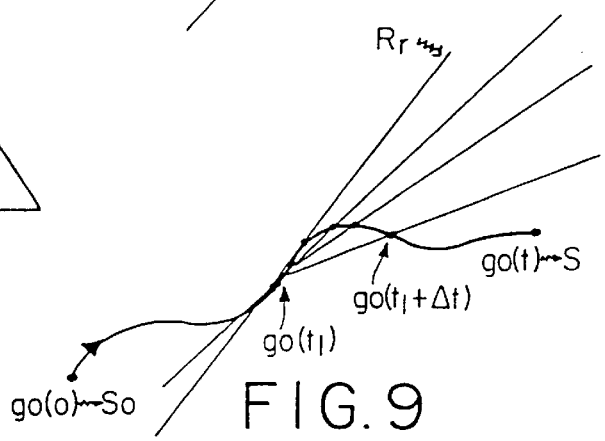
FIG. 9 is an illustration of a right tangent.
Figure 10:
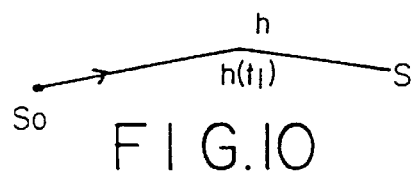
FIG. 10 shows a line which is not a growing line.
Figure 11:
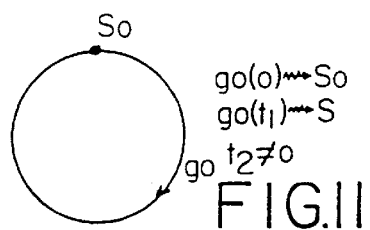
FIG. 11 shows an example of a growing line which cannot simply be described with the concept of derivative.
Figure 15:
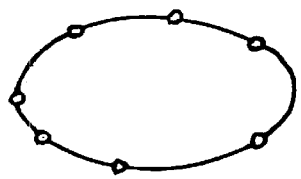
FIGS. 14–18 show examples of cross sections of wave guides, the boundaries of which are not simply closed curves.

Thus the left tangent is not defined in the point $S_r$. (See FIG. 8). The right tangent $R_r$ in the point $g_c(t_1)$ is defined as the limit line of a bundle of connection lines of $g_c(t_1+\Delta t)$ and $g_o(t_1)$, when $\Delta t \geq o$ and the limit $\Delta t \downarrow o$ is taken. Thus the right tangent is not defined in the point S. (See FIG. 9). $g_o$ has the property that in each point $g_o(t_1)$, if $o < t_1 < t$, the left tangent of $g_o$ coincides with the right tangent of $g_c$. An example of a line which is not a growing line is shown in FIG. 10. An example of a growing line which cannot simply be described with the concept of derative is shown in FIG. 11. There S and $S_c$ coincide at $t=t_1$.

Figure 4:
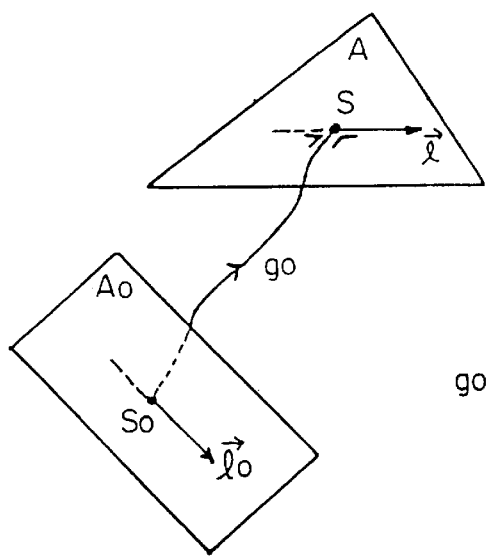
FIG. 4 is an illustration of an unbifurcated growing line.
Figure 12:
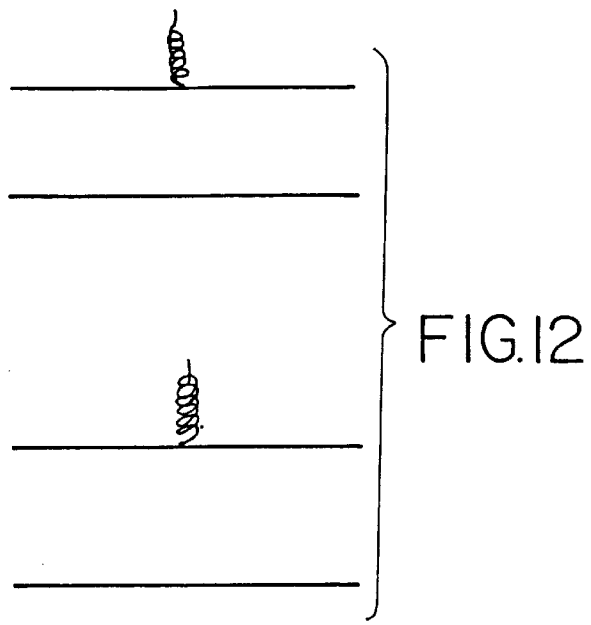
FIG. 12 shows symbolically one of the methods to be used to realize a changing of shape of the cross section of an unbifurcated cavity as a function of time.
Figure 16:
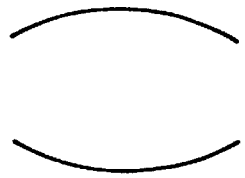

The wall of an unbifurcated cavity is defined as the set of points, situated on the boundary of the cross section A, when point S moves along $g_c$, while the left tangent in S to $g_o$ is always perpendicular to the cross section A, unified with the set of points situated on the boundary of the surface $A_o$, which is the limit set of the bundle of boundaries of cross section A when $\Delta t \geq o$ and the limit $\Delta t \downarrow o$ is taken (See FIG. 4). By definition the cross section A changes its shape continuously as a function of the time. One of the methods to be used to realize such a changing is with the help of a spring. This method has been sketched symbolically in FIG. 12. If the shape of cross section A is dependent of time, and if after a certain point of time the shape of the cavity is independent of time while $g_o$ is a simply closed curve, one has to provide A has the same shape at every passage through $S_o$. Besides this, the following symmetry condition has to be met:

Let $\phi$ be the angle of rotation of $\vec{1}$ when S moves along the growing line g; let $\vec{1}_o$ be parallel with u-fold symmetry axis of A; let S be situated on the rotation axis of the u-fold symmetry of A; let $\phi=o$ hold when S coincides for the first time with $S_o$. If S arrives at a certain time at $S_o$, then $\phi=\pm m(n-1).2\pi/u$ where u and m are integers.

In order to be able to define the plus and minus signs in the formula for $\phi$ we use the following axiom:

The angle about which $\vec{1}$ has been rotated, while A was moving exactly once along the simple closed growing line $g_o$, is independent of the shape of $g_o$. Now we map $g_o$ in such a way on a circle that its length is conserved. Then $g_o$ is transformed into $g_o^1$, S into $S^1$ and $S_o$ into $S_o^1$.

The plane in which $g_o^1$ is situated is called the gauge plane, $\gamma$. The + sign in the formula for $\phi$ has to be used if, in the gaugeplane, $S^1$ withdraws from $S_c^1$ in a clockwise direction and if $\vec{1}$, as seen from $S^1$, withdraws in the direction which is induced by the direction in which $S^1$ withdraws from $S_o^1$ at the moment that $S^1$ an $S_o$ coincide, than after one revolution more has been rotated in the counter clockwise direction than in the clockwise direction.

The minus sign is used when after exactly one revolution $\vec{1}$ has been rotated more in the clockwise direction then in the counter clockwise direction. (See FIG. 13)

Note that if A coincides with a rectangle while n=1 holds, the wall of the cavity is represented by a Möbius band of finite thickness.

Then $\phi=\pm m(n-1).\pi$ holds.

The case $\phi=o$ is of interest because it can occur that $\vec{1}$ first rotates to the left about the angle $\phi_{o1}$ and then rotates about the angle $\phi_{or}$ to the right. Let us consider the general case in which $\phi=0$ yields. Suppose $\vec{1}$ rotates before changing its direction of rotation, about the angle $\phi_{o2}$ to the left and next before $\vec{1}$ rotates again to the left, it rotates about the angle $\phi_{or}$ to the right and so on. In that case after N rotations $\phi$ can be written as $$\varphi = \sum_{i=1}^{N} \varphi_{ol}(i) - \varphi_{or}(i) \text{ with } \varphi_{ol}(i) \cdot \varphi_{or}(i) = 0$$

Note that in case N=2, in case that A coincides with a rectangle, $\phi_{o1}=\phi_{or}=(n-1)\pi$ with $n \geq 1$ can occur. Cavities having a simply closed growing line are called fermion cavities if $\phi \neq o$ yields and boson cavities if $\phi=o$ holds.

Figure 13:
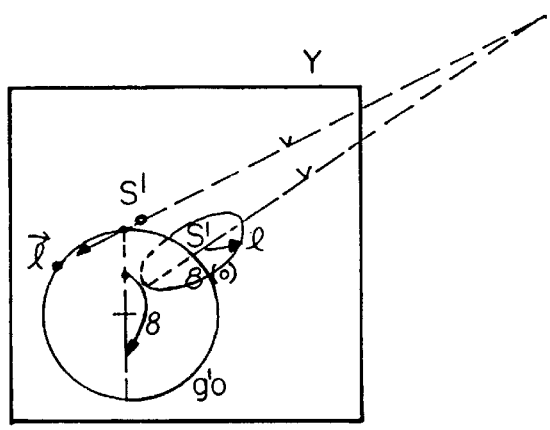
FIG. 13 shows a gauge plane and an oriented basis line segment.
Figure 17:
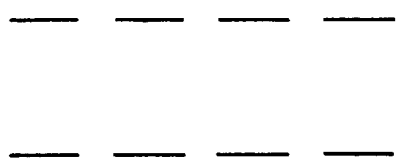
Figure 14:
Figure 18:

In general it is not necessary that the shape of A be constant. If the growing line is an unbifurcated simply closed curve, which is passed through a whole number of times, a condition has to be met in order that the shape of the cavity is constant. Let $|g^1(t_1)-g^1(0)|$ be the length of the route which has been covered along g in the time interval $(0,t_1)$, $1/v$ be the time interval between two sequential passages of S through $S_o$. Let A be invariant under rotations about the angle $\theta$, in the gauge plane, obeying $\theta=2\pi/j$ where j is an integer then the shape of the cavity is conserved if $j=|g^1(1/v)-g^1(0)|/|g^1(t_1)-g^1(0)|$. In FIG. 13 the case j=2 has been sketched.

The outer wall of the material of which the wall of the unbifurcated cavity exists is defined as the set of points situated on the boundary of the cross section $A_e$ when the point S moves along the unbifurcated growing line $g_o$ while the tangent of $g_o$ in the point S is perpendicular to $A_e$, while $A_e$ has the following properties:

1) $A \subset A_e$. 2) The boundary of $A_e$ is disjunct with the boundary of A. 3) In case the boundary of A is not a simply closed curve then the union of the boundaries of A and $A_e$ consists exclusively of simply closed curves. 4) If the boundary of A is a simply closed curve then the boundary of $A_e$ is also a simply closed curve. In the FIGS. 14 through 18 some examples of periferies of the surface A in H-mawag are shown. There, a small circle symbolized one omitted point. A bifurcated cavity has, except for properties of an unbifurcated cavity, the following properties:

1) Let $g_o$ be the not yet bifurcated growing line of the cavity. Then $S_o$ is the starting point of $g_o$:$g_o$ having a splittingpoint $S_k$ of the k-th order if the growing line $g_o$ splits $S_k$ with the k+1 growing lines. These are called $g_{1,1}, g_{1,2}, \ldots, g_{1,k+1}$ respectively.

2) This splitting takes place at the same time as a k+1-fold splitting of the point S, situated at the bottom of $\vec{1}$ and in such a way that on every growing line which has left $S_k$, there is exactly one point $S(1,p)$ moving along the growing line $g_{1,p}$, where p is an integer obeying $1 \leq p \leq k+1$. In general $S(i,m)$ is the temporary endpoint of the growing line $g_{im}$ which arose after S had left $S_o$ and at a place coinciding with the i-th splittingpoint $_iS_k$ of the k-th order which S met after its departure from $S_o$. Thus $k \approx o$.

3) Let x be a string of figures, let $g_x$ be a branch of a growing line temporarily ending at the splittingpoint $S_k$. The growing lines which leave $S_k$ are called $g_{x,p}$ where p is an integer obeying $1 \leq p \leq k+1$. In FIG. 19 the point $S_2$ has been sketched. In FIG. 20 the point $S_1$.

4) In $S_k$ all tangents to $g_x$ and $g_{x,p}$ coincide.

5) In $S_k$ all orientated basic line segments of the growing lines $g_x$ and $g_{x,1}$ through $g_{x,k+1}$ coincide and are parallel to each other.

6) Each of the k+1 branches of a bifurcated growing line functions in the same way as an unbifurcated growing line in either description of the wall of the cavity, or the outer wall of the material of which the cavity has been made.

7) If a growing line has a joining point $O_k$ of the k-th order, then at the same point of time k+1 temporary endpoints are passing through $O_k$. In FIG. 21 the point $O_2$ is shown.

8) In a joining point the tangents to all the growing lines coincide.

9) In the joining point $O_k$ all orientated basis line segments of all in $O_k$ joining or departing growing lines coincides and are all parallel to each other.

10) A joining point $O_k$ of the k-th order is an insertion point $I_k$ of the k-th order if there exists both a point of time $t_1$, such that at $t=t_1$ is exactly one temporary end point in $I_k$, and a time interval $\Delta t_1$ with $\Delta t_1 > o$ such that at each point of time $t=t_1+\Delta t_1$ k+1 different temporary end points are either in $I_k$ or have been there.

11) An insertion point $I_k$ is parallel respectively antiparallel if $I_k \leftrightarrow g(t_1)$ and $I_k \leftrightarrow g(t_2)$ while $t_2 > t_1$ and there exists a time interval $\Delta t_2$ with $\Delta t_2 > o$ such that the shortest route between $g(t_2 + \Delta t_2)$ and $S_o$ measured along growing lines is longer in absolute value, respectively shorter in absolute value than the length in absolute value of the shortest route, measure along growing lines between $g(t_2)$ and $S_o$. An insertionpoint of zero order which is antiparallel is shown in FIG. 22, while in FIG. 23 an insertion point of the first order is shown which is parallel.

12) In a joining point renumeration of growing lines takes place. As a consequence the index of the growing line $g_x$ arriving at $O_k$ will be changed and the name of the new growing line will be $g_{xls}$, where s is a non negative integer with $s \leq q$ and where q is the number of temporary end points leaving $O_k$.

13) The growing line $g_x$ is said to be reflected in the joiningpoint $O_k$ if $g_x(t) \leftrightarrow O_k$, $t=t_1$ and if there are r temporary endpoints leaving $O_k$, if $r>0$, such that there exists a point on the growing ling $g_x$ that at the point of time $t_1 - \Delta t_1$ can be characterized by $g_x(t_1 - \Delta t_1)$ and at the point of time $t_1 + \Delta t_2$ by $g_{x|w}(t_1 + \Delta t_2)$ where w is an integer satisfying $1 \leq w \leq r$. A reflecting growing line in the point $O_o$ is shown in FIG. 24.

14) The growing line $g_x$ is said to be absorbed in the joining point $O_k$ if its temporary endpoint does not leave $O_k$ anymore. An absorbed growing line in the point $O_o$ is shown in FIG. 25.

15) A joining point is a source $B_v$ of the v-th order if $v>o$ holds and the number of temporary endpoints leaving $B_v$ minus the number of temporary endpoints arriving at $B_v$ is equal to v.

An example of a source point of the third order is shown in FIG. 26. An example of a source point of the second order which eventually can be an insertionpoint of zero order is shown in FIG. 27.

16) A joining point is a sink $P_a$ of the a-th order if the number of temporary endpoints arriving at $_a$ minus the number of temporary endpoints leaving $P_a$ is equal to a, while a meets $a>o$. An example of a sink of the second order is shown in FIG. 21.

17) A joining point $O_k$ is totally reflecting if $O_k$ coincides with the sink $P_a$ while $a=k+1$. The joining point $O_o$, which is shown in FIG. 25 is totally absorbing.

18) A joining point $O_k$ is totally reflecting if $O_k$ coincides with the source $B_v$ while $V=k+1$ is met. The joining point $O_o$ shown in FIG. 24 is totally reflecting.

19) The reflectance R of a joiningpoint $O_k$ is defined by the quotient:

$$R = \frac{\text{The number of reflected temporary endpoints}}{\text{The number of arriving temporary endpoints}}.$$

For the point $O_1$ shown in FIG. 25 R=0.5 yields.

20) The absorptance H of a joiningpoint $O_k$ is defined by the quotient:

$$H = \frac{\text{The number of absorbed temporary endpoints}}{\text{The number of arriving temporary endpoints}}.$$

In FIG. 25 H=1 yields for the point $O_o$.

21) A growing line is n-fold closed in point S after leaving $S_o$ arrives exactly n times at $S_o$ and if $S_o$ is thereafter an endpoint of that growing line. A growing line is definitively closed if there exists a time interval $\Delta t$ with $\Delta t \neq 0$ such that each time $t_i$ that S arrives at $S_o$ it will arrive again at $S_o$ at $t_i + \Delta t$. The examples shown in the FIGS. 27 through 30 can be related to an n-fold closed growing line as well as to a definitively closed growing line.

22) $S_{ob}$ is a source point of the b-th order if b growing lines start at $S_{ob}$.

23) A source point of the b-th order is a joiningpoint of the (b−1)-th order.

24) A point $K_c$ on a growing line $g_x$ is a crossing of the c-th order of $g_x$ if $K_c$ is not a source point of $g_x$ and the temporary endpoint S. After leaving $S_o$, S coincides exactly c times with $K_c$ before it arrives at $S_o$.

The invention extends to all kinds of mawag circuits which can be described with the help of the concepts which are introduced in this chapter, "The topology of mawag". Of great importance in the property of a growing line is that in each point of a growing line excluding $S_o$ and S, the left tangent and the right tangent of the growing line coincide.

In this chapter a mathematical definition has been given of the inner surface of an unbifurcated cavity. That definition can be used for the description of physical phenomena by applying the following two rules of correspondence:
1) The boundary of the cross section A coincides with the boundary of two different media.
2) The boundary of the cross section A coincides with a curve whereon the wave function $\Psi$ either the particle moving through the "cavity" or the group of particles moving through the "cavity, has the property $\Psi=0$.

Figure 69:
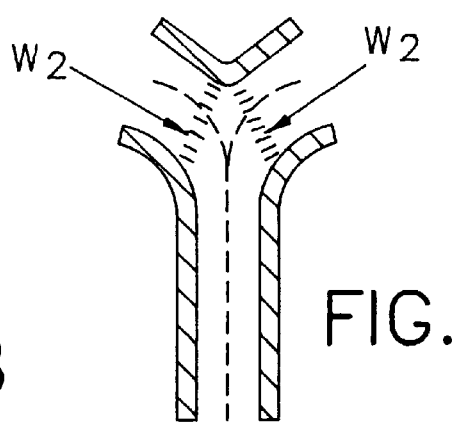
FIG. 69 is an illustration of a splitting point of two growing lines shown in longitudinal section in a bifurcated wave guide.

The latter rule is applicable if there is a kind of cavity but no two media. Two examples are the "cavity" in which an electron, that is a part of hydrogen atom, moves and the "cavity" in a magnetic bottle in which an electrically charged particle moves. Three remarks can be made about the property of an unbifurcated growing line, which is in the centre of gravity of the periphery of A and is situated on the growing line:

i) This property does not apply beyond the bifurcation point. Bifurcations can be described by considering both splitting and joining growing lines as unbifurcated growing lines and by considering those parts of the inner walls of the cavity which at extension would block the passages in the cavity, as non-existing. This is illustrated in FIG. 69. There, a splitting point of two growing lines is shown in longitudinal section. Those parts of the wall $w_1$ and $w_2$ which correspond with these two growing lines, do not exist in reality according the above mentioned rule.

ii) This property, in general, does not apply if the boundary of A is a function of time. An example of such a situation can be realized with the experiment shown in FIG. 12. The spring symbolizing in that figure elasticity does not necessarily have to correspond with a push spring or a pull spring, but may also be realized as either a piezo electric crystal or as an absorption place of radiation, heating the boundary of A periodically. In this case the inner surface of the waveguide can still be described with the growing line formalism provided that two mutually independent time coordinates $t^1$ and $t^{11}$ are introduced. In that case $t^{11}$ can be varied while $t^1$ is constant. This results with the effect that:
1) At every point of time $t^1$ there is exactly one growing line whereon the center of gravity of the boundary of A is situated.

Figure 73:
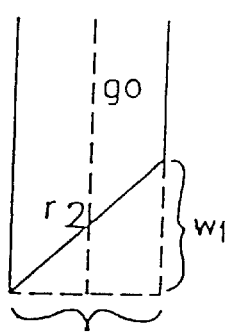
FIG. 73 is an illustration of a longitudinal section of a truncated rectangular wave guide.

2) In general growing lines do no coincide at the points of time $t_1^1$ and $t_2^1$.

iii) In general this property does not apply if the boundary of A is not closed or doesn't have constant shape. An illustrating example is shown in longitudinal section in FIG. 73 where A and $g_o$ are used to describe the wall of a truncated rectangular wave guide.

By first considering the wave guide as being not truncated, with the effect that the wall $W_2$ and the boundary $r_1$ exist, the wall of the wave guide still can be described with the help of the growing line formalism. Then the description with the help of the truncated wave guide is identical with that of the non truncated wave guide provided that the boundary $r_1$ is replaced by the boundary $r_2$ while the part of the wall $W_1$ is left out afterwards. This way, by adding before hand or leaving out afterwards, an arbitrary truncated wave guide or an arbitrary incised wave guide or an arbitrary truncated incised wave guide can still be described with the help of the growing line formalism provided the following two conditions are met: 1) The growing line of the truncated or incised wave guide, united with its extension, exists. 2) There exists a point $g_o(t_1)$ of the growing line of the truncated or incised wave guide unites with its extension, that links up with the growing line of that part of the wave guide which is neither incised nor truncated, in such a way that the left and the right tangent in $g_o(t_1)$ coincide. Examples of cross sections of incised wave guides are shown in the FIGS. 14 through 18. Thus, the invention concerns also incised or truncated wave guides and combinations thereof provided, in case they are united with their extensions, they have the properties 1) through 6) as stated on the pages 8 and 9. Truncated wave guides are used to change the direction of propagation of waves and incised wave guides are used to minimize effects of back radiation.

The growing lines of the cavities are defined in such a way that makes them very suitable to describe integrated circuits of mawag for particles or to describe the behavior of the so called auto waves which play a role in periodical chemical reactions as well as in the behavior of unicellular living organism.

Depending on the application, the shape of the outer periphery of A can be chosen. In general, this shape may be different from the shape of a closed curve.

E.g. it coincides with the boundary or the boundaries of medium 1 in one of the examples shown in the FIGS. 1.1. through 1.14 and 2. It can have the U-shape, see FIG. 14, or consist of a closed curve in which holes are situated, (see FIG. 15) or consist of two parallel segments of line in which holes are situated, (see FIG. 18 and FIG. 19). It is also possible to let the periphery of A fluctuate as a function of time. Such mawag-material, for instance, can be used in the communication, technic. (See FIG. 12).

Mawag that has exactly n characteristic dimension of the same order of magnitude as the de Broglie wavelength of a particle or of a group of particles that moves through the wave guide or can move through the wave guide is called (3–n)-dimensional mawag, where n is a positive integer. According a generalization of this definition bulk material can be called 3-dimensional material. An example of o-dimensional mawag is a "wave guide" consisting of one atom in which an electron moves around the nucleus of an atom.

If mawag is constructed as a screen with holes then, depending on the kind of application, it can be of importance to give the outer surface of mawag a certain shape. If for instance it is the aim to let as many particles pass as possible having a translational momentum p satisfying $|\vec{p}| \geq |\vec{p}_o|$, then it is of advantage to construct the cavities as two dimensional mawag and to curve the outer surface of mawag in two mutually perpendicular directions in order to be able to let the particles coming from three mutually perpendicular directions pass.

The invention extends also to bundles of wave guides which are situated next to each other and are truncated in such a way that the boundaries of their walls are situated on a surface having the property that in each point, of the section of that surface with a plane, which is not situated on the boundary of that surface, the left tangent to that surface coincides with the right tangent to that surface in the above mentioned plane.

The invention extends also to bundles of incised wave guides which are incised in such a way that they unite with their extensions. They then consist of bundles of truncated wave guides which have the above mentioned property of truncated wave guides.

2) Manufacturing of Mawag

Before starting the manufacturing of mawag one must first calculate the magnitude(s) of its characteristic dimensions. This calculation takes place by solving the relevant wave equation while meeting the proper boundary conditions. Therefor one has to take into consideration whether mawag is going to be used to reflect or to transmit either bosons or fermions. The wall of the waveguide can consist of a vacuum, a plasma, a gas, a vapour, a liquid or a solid. The wall of mawag can also consist of the material of which the wall of the cell of an unicellular organism consists. The construction therof is not described here. An example of mawag in which the wall consists of vacuum is the wall of the wave guide in which an electron moves if it is a part of a hydrogen atom. Another example is the wall of a wave guide in which an electron moves in a magnetic field which is so strong that twice the radius of curvature of the path of the electron is of the same order of magnitude as the de Broglie wavelength of that electron. In this case, the wall of the waveguide coincides with the surface that is identical with the set of points wherein the wave function of that electron is zero. For a number of applications it is of importance that the mean of the nearest-neighbour-distance of the particles of which the wall of the waveguide consists is smaller or equal to half of the de Broglie wavelength of either the particle or the group of particles that is transmitted through the wave guide. Therefore, in FIG. 70, a number of nearest neighbour distance, a, as been tabulated for atoms in an imaginary cubic crystal.

First we will deal with the formulas. Let $N_o$ be Avogadro's number $V_o$ the with $N_o$ corresponding volume of an ideal gas, p the density of a solid and $A_r$ its atomic weight in kilograms. Then under standard conditions for an ideal gas we have $a \approx (V_o/N_o)^{1/3}$ and for a solid $a \approx (A_r/(p\ N_o))^{1/3}$. The nearest neighbour distance has to be compared with the de Broglie wavelength $\lambda_b$, for which some formulas are given below. Let h be Planck's constant, m the mass of a particle propagating with velocity $\vec{v}$, c the velocity of light, $|\vec{v}| < |c|$ then yields according to de Broglie for the said particle $\lambda b = h/(mv)$. Let $\nu$ be the frequency of a photon and n the refractive index of the medium in which the photon propagates. If this case is met $\lambda_b = nc/\nu$ yields. An estimation of the de Broglie wavelength can be made with the help of an expression for the mean translational energy of a particle which is a part of a gas which has a Maxwellian velocity distribution. Let k be Boltzmann's constant, T the absolute temperature of the gas, w the number of degrees of freedom to be used to calculate the mean translation energy, creating $\lambda_{bm} = (h^2/(wmkT))^{1/2}$. If by analogue, we have for a particle in a boson gas with mean wavelength $\lambda_{bes}, \lambda_{be} \leq \lambda_{bm}$ and for a particle in a degenerated fermion gas consisting of N particles in a volume V, mean wavelength $\lambda_{bd}$, the following expression yields:

$$\lambda_{bd} = h/(2mT((\pi k/h)^2.mT.((4\pi V)/3N))^{2/3} + \ldots)^{1/2}$$

Another method to estimate $\lambda_b$ is by using the expression eV for the energy absorbed by a particle with electric charge e that is first at rest and passes afterwards through a potential difference V. Then $\lambda_b = h/(2 \text{ meV})^{1/2}$ holds.

From FIG. 70 we deduce the following conclusions:

1) There exist solids of which wave guides can be made for light or for electrons with the effect that these wave guides at a temperature of 273 K can transmit light or electrons.

2) There exist solids of which wave guides can be made for hydrogen, $H_2$, such that these wave guides can conduct $H_2$ at a temperature near 3 K.

If mawag consists of thin layers then that material can be manufactured with the help of vapour deposition technics which are known from the literature. Then it is of importance to choose carefully the solids one wants to deposit as well as the substrate on which the first layer has to be deposited. The crystal structure of the substrate namely determines strongly the number of unit crystal cells in the solid to be deposited. If one wants to arrive at fair plane layers of crystal one chooses a mono crystal and preferably an ideal mono crystal in which the atoms are situated in planes which are parallel with the surface to be used for the vapour deposition. Besides this one also chooses substrate and solids to be deposited such that they have the same crystal structure. Preferably, the mutual distances of the atoms in the crystal of the solid to be deposited are a factor n or 1/n times as great as the comparable mutual distances of the atoms in the substrate, where n is a very good approximation an integer. A similar condition yields for the layers which have to be deposited there after. If one does no want layers consisting of crystal, then it is of importance to use a material with a glass structure as a substrate Preferably one keeps the glass at a very low temperature so that the vapour to be deposited has no time to crystallize. Rapid motions in the form of translation, rotations or vibrations in combinations with a sufficiently high concentration vapour to be deposit as well as the presence of a cold substrate enhance the deposition of glasses.

An alternative to arriving at a packet of layers of glasses, is the following method. Firstly cool down every deposited layer which is crystallized. Secondly melt these layers quickly with the help of radiation produced by lasers in order to quench the material there after.

A method to make one or two thin layers is to guide a vapour into a split between two parallel plates, which are kept on a constant distance of one another with the help of thin strips or in other ways. The vapour will deposit on parallel plates, which are the walls of the split. Before the vapour enters the split between the two plates, the surface of the plates has been cleaned in vacuum with the help of radiation from a laser or a maser.

During the inlet of vapour it is also possible to send monochromatic radiation through the split such that there arise parallel regions in which the direction of electric fieldstrength caused by the radiation is constant during half a period and perpendicular to the parallel surfaces of the split. Then there can arise strips of material which are centered around the lines of the maximum absolute value of the electric field strength. In order to fixate these lines, it is necessary to transform the split into a resonance cavity. That can be done by putting a half transmitting mirror at the entrance of the split, by putting a mirror at the rear of the split and by meeting the condition that the distance between those mirrors is equal to a whole number of a half wavelengths of the monochromatic radiation present in the split. In order to arrive at the effect that the gas or vapour is deposited on exactly one plate instead of on two plates, one canionise these gases or vapours with the help of maser or laser light of a suitable wavelength or with the help of a strong electric field between the two plates. Preferably in this case at least one of the plates should be a good conductor of electricity.

A method to obtain exactly one thin layer is to keep a plane, cold plate above a liquid and to apply an electric field in order to deposit a layer of ions, coming form the liquid, on the cold plate where it takes the structure of a solid. By using pulsed electric fields one can arrive at very thin deposited layers.

H-mawag, for instance, can be made from a very thin, e.g. about 25 $\mu$m thick, material in which cavities are machined with the help of electromagnetic impulses of a suitable maser or laser. Preferably these pulses are transformed by a hologram which contains the proper and sufficient information about the cavity pattern to be realized. If required these cavities can be filled afterwards with a medium having certain required physical properties. The above mentioned hologram preferably has been constructed with the help of a computer aided plotter drawing an interference pattern according a method discussed in the Dutch patent application no. 8602590.

The cavity pattern can also be manufactured by bringing the material in its plane in an scanning motion of an laser or maser which delivers electromagnetic impulses according to a program which can be designed before hand.

In the machining of the cavity pattern by a laser or maser, depending on the chaise and the thickness of the material it is in some cases desirable to bring the working material to a very low temperature in order to avoid combustion phenomena on the other hand, pre heating of the working material can be required in order to arrive at a high production rate.

The production rate can be increased by increasing the heat resistance between, with the help of a laser or maser, molten material and the material which has not been molten yet. This is possible for magnetic materials if these materials are brought into a magnetic field of sufficient field strength.

In case one wants to use a substrate, then the screen obtained by the above mentioned method can be fixed to the substrate with suitable sticking materials.

Mawag can also be manufactured with galvanic methods. In that case it is important that the electrode on which mawag has to be deposited is situated in an solution of a sufficiently high ionconcentration in order to be able to deposit a thin homogeneous layer in an short time. Therefor, it is requited that the electric fieldstrength on the electrode is practically constant. By varying the kind of ionconcentration, various kinds of mawag can be deposited above each other. If required, these layers can be alternated with layers which have not been deposited along galvanic methods, such as insulating layers.

Mawag can also be made by bringing an external magnetic field into an electric conductor. The function of the magnetic field in this case, is to provide that the radii of curvature of the electrically charged particles in the magnetic field are of the same order of magnitude as the de Broglie wavelengths of those charged particles. If one can realize the above mentioned situation and the electrically-charged particles move in the conductor, then, at sufficiently low temperature, the specific electric resistance of that conductor is smaller than the absence of the applied magnetic field provided the applied electric field is either parallel or anti-parallel to the applied magnetic field; the magnetic fieldstrength is sufficiently high and the electric conductor has practically no crystal defects. A magnetic field of sufficient strength can be realized by applying an external magnetic field which goes through an electric conductor which preferably consist of magnetic material. The specific electric resistance of mawag that has been designed as a material of low electric resistance, as described at 3.6, in some cases can still further be reduced by surrounding the mawag with a thin layer of an electric insulator. That layer is used to increase the absolute value of the derative of the potential of the conduction electron near the wall of the conductor in order to increase the height of the lowest energy level in the potential well.

By taking bulkmaterial having crystal defects as a raw material or by introducing crystal defects in bulkmaterials using the methods described in the literature, it is possible to make mawag that is not a superconductor starting with electric conductive material as a raw material. Application of the above mentioned method is at least required to realize the glow screen shown in FIG. 3.13. In order to make a cable of wave guides as shown in FIG. 53 glass fibers of circular cross section are transformed by a diamond dies, of proper dimensions, into glass fibers of rectangular cross section, which afterwards are supplied with either an electric conductive or an electric non conductive upper layer and are piled and fixed in a way which is shown in FIG. 53. The fixing can for instance be realized by first melting the conductive upper layers with the help of an electric current and afterwards cooling them in order to solidify them. An alternative method is gluing. It is also possible to realize M-mawag by using chemical methods to make molecules having cavities. The growing lines of these cavities can be made parallel to each other by using the proper molecules as a reagent at the proper temperature and pressure in an homogeneous field. Depending on the choice of the molecules a choice can be made from electric, magnetic and gravity fields as well as from a combination of these fields. H-mawag can also be made of M-mawag, provided M-mawag is a solid. Thereto, bars of M-mawag consisting of material 1 are surrounded by a medium of material 2 where, after material 1 is removed by a chemical process, H-mawag consisting of material 2 or material 3 remains.

The outer surface of the wave guides in mawag can be transformed by bending, torsion, milling, grinding, polishing, sawing, drilling, cutting and etching. For the cutting and drilling a laser can be used.

Pollutions of H-mawag can be removed by, leading a high pressure gas through H-mawag that has preferably been coupled to a supersonic vibration source or by using a suitable solvent.

3) Applications of Mawag

Below we treat a number of applications of mawag.

3.1) Material with Low Specific Heat

The low specific heat of mawag is a direct consequence of the less than three dimensional character of mawag. As a consequence, mawag is suitable to be used in heat technic e.g.:

3.1.1. To absorb radiation energy in solar collectors with the effect that the temperature of the collector plate can raise rapidly. This can increase the efficiency of e.g. The flat plate collector.

3.1.2. To realize wall heating.

H-mawag, due to its low specific heat, is very suitable to be used as a wallheating panel or wallheating element. Such a panel or element can heat a part or whole wall of a room with the effect that radiation heat is brought into the room; and depending upon the air temperature one can achieve a constant level of comfort which is then able to reduce the temperature of the air in the room. Such panels or elements not made of mawag do exist already. See for instance the paper "Precisieverwarmingssystemen" in De Ingenieur, no 9, page 55 (Sep. 1986). However, the conventional panels have four disadvantages with respect to the said invention. In the first place they also emit radiation of wavelength $\lambda$ which is greater than the cutoff wavelength $\lambda_c$ of the H-mawag which has been used in the invention and which has been designed so that almost no cold radiation is emitted. For that reason, their efficiency is lower than that of the comparable panels made of H-mawag. Secondly, their reflectance of heat radiation is lower than that of H-mawag, with the effect that a person emitting heat radiation in the above mentioned room is less protected against heat losses than if the walls of the room were to be covered with properly dimensioned H-mawag.

Thirdly, it is not necessary that the wall heating element is fed by electric energy. It can also be fed by heat from a heat bath, like a tube or a radiator of the central heating, or a tube which is heated by a burner, or by the sun.

Fourthly the amount of heat delivered by the H-mawag heating element by way of convection is considerably less than the amount of heat delavered by a conventional heating element, since the surface area which is in direct contact with the convection flow, is in the case of H-mawag considerably smaller than the surface area of a conventional heating element of comparable dimensions. It is clear that the H-mawag wall heating element has to be situated at the surface of a wall and has to be well insulated of the remainder part of the wall in order that the heat of the heating element does not leak into the wall. For instance H-mawag could be hanged like a curtain just in front of the wall. In that case, one can make holes in it order to allow for the hanging of pictures on the wall. The applicabilities of H-mawag for the realization of wall heating, concern all the applicabilities of the precision heating system in the above mentioned literature and are even considerably extensive due to the possibility that it is not necessary to make use of electric energy.

3.2 Catalyst of Chemical Reactions

In chemical reactions, the electronic configuration of the matters involved change. Therefore, in some cases, the starting of chemical reactions is improved if there is an excess of electrons present and if the de Broglie wave of such an electron has a good chance to overlap the de Broglie wave of at least one of the reactive matters. An excess of electrons is obtained by using a material with a low work function. Such a material is H-mawag. The low work function has three causes:

1) The quotient surface/volume is for mawag at a given value of the mass of a matter considerably greater than for the bulkmaterial that consists of the same kind of molecules as H-mawag.

2) The mean distance to the H-mawag surface at a distance d from the tangent plane to that H-mawag surface, is greater than the mean distance to the tangent of the outer surface of H-mawag, provided these two surfaces have the same boundary.

3) Due to the less than three dimensional character of the Fermi-gas of the electrons in mawag, the energy difference between the two lowest energylevels is in properly designed mawag considerably greater then for a three dimensional gas. Due to mawag the electrons in the cavities of mawag have to relatively long wavelength. That is due to the fact that the gas in the cavities in H-mawag can be considered as a less than three dimensional Fermi-gas. Such a gas has a considerably lower specific heat than the corresponding three dimensional gas with the effect that de Broglie wavelength of an electron having the mean energy per particle is considerably longer than in a three dimensional gas. The dimensions of the H-mawag forbid those reactions which would take place by emitting electromagnetic radiation of a wavelength which is larger than the cutoff wavelength $\lambda_c$ of the waveguide in which the reaction would take place. This way it is possible to process properly chosen chemical reactions in the desired direction in order to prevent the arising of undesired matters. Those chemical reactions are enhanced emitting electromagnetic radiation having a wavelength equal to the cutoff wavelength or having a frequency equal to the frequency of one of the eigen frequencies of the cavity. Besides, those chemical reactions are enhanced, requiring an amount of energy per molecule corresponding with the difference in energy between two energylevels which arose due to the presence of the resonance cavities in the mawag.

These energy levels can be calculated exactly with the help of quantummechanics. With the dimensioning of the cavities one has to take into account that the effective width of a cavity can be smaller than the theoretical width. This effect is due to the adhesion of molecules at the surface of the inner wall of the cavity. When choosing the molecules to form H-mawag one has to take into account that these molecules are not supposed to take part in any chemical reaction. By putting H-mawag on a negative electric voltage the catalytic effect of H-mawag can still be enhanced. If the reaction is exotherm then one can start in the above mentioned way a chemical reaction. H-mawag for instance could be used in combustion engines in order to operate these engines at a lower temperature with the effect of reduced air pollution. For instance the radiation absorbing matter mentioned in the Dutch patent application 8601079 could consist of H-mawag. It can also be used to clean exhaust gases.

The above mentioned catalyst action arose also due to the excessive presence of electrons. However, there are also reactions which are enhanced by matter which has the possibility to bind electrons. Examples are elements with a high valency like $P_t$ and C. Thus their catalytic action can be enhanced by putting these matters on a positive electric voltage. Such catalysts can be constructed like H-mawag and can be placed in a so called "reactiontree". Such a tree is described in 3.16.

The property of H-mawag, due to the geometry of its cavities, to forbid some reactions and to enhance other ones is specific for H-mawag. This distinguishes H-mawag of a catalyst which consists of the same kind of molecules as H-mawag but has the form of a bulk material.

3.3 Mirrors

An application of mirrors, which can be made by using mawag and which has not yet been mentioned, is protection in the widest sense against very intense electromagnetic radiation. Space capsules could be equipped with them in order to avoid early damage. Another application is for a sail on a space sonde which is propelled by the pressure caused by electromagnetic radiation. The advantage of H-mawag here is the smaller mass per surface unit of the mirror in comparison with mirrors made of foils. This property allows the mirrors to give large linear dimensions with the effect that it is of advantage to use them in astronomy since they are per surface unit of the mirror, cheaper to bring into space. The solar wind sail can be constructed in such a way that it is stretched between two rolls. One roll is designed to be able to roll down the sail the other to roll up the sail. In case these rolls are not damaged by meteoric stones while the sail is damaged a new piece of sail can be put on the sonde by rolling up one roll while rolling down the other one, (see FIG. 31). In that figure E corresponds with the mast A, B, C and D are possible points to fasten the thethers of the sail in order to direct the sail with respect to the space sonde.

H-mawag can also be used for the construction of mirrors for particles having a velocity v which is smaller than the velocity of light. Let m be the mass of such a particle and $m_p$ the restmass of the proton. Then the wavelength $\lambda$ of such a particle is given by $\lambda = 3.97 \times 10^{-7} . m_p/(mv)$. Since the nearest neighbour distance of atoms in a solid is of the order of $0.2 \times 10^{-9}$ m, the effect of such a mirror for particles having a subliminal velocity is restricted to particles with a very small translational momentum.

3.4 Phase Dependent Mirrors

Phase dependent mirrors consist of H-mawag. They are used for the reflection or transmission of linear polarized particles. Their linear dimensions are for bosons different from those for fermions. Such a mirror can be characterized with the help of the growing line formalism. The mirror consists of unit cells. The cavity of such a unit cell for instance can be characterized by:

$A_o$ is a rectangle with sides of magnitude $2l_o$ and $2l_{o2}$.

A is a rectangle with sides of magnitude $2l$ and $2l_2, l_2 = l_{02}$ with $l_{02} \geq \lambda/(2s)$.

$$l_1 = (\lambda/(2s))|\sin((2\pi/\lambda)g^1(t)-\delta)| + \Delta l_1/2$$

where $\lambda$ is the wavelength of the particles for which the mirror has been designed and $\delta$ the phase, $\Delta l_1$ is a parameter which is a measure for the bandwidth of the waves which are transmitted by the mirror. In FIG. 32 a longitudinal section of a unit cell of a phase dependent mirror is shown of which the length of a growing line is equal to L while the phase yields $\delta = \pi/6$. FIG. 33 shows one of the cross sections of A which correspond to that growing line. Thus the point $g^1(t) = g^1(0)$ in the gauge plane with both the phase of the mirror and the cross section $A_o$. In the description of particles the phase of a particle by definition is determined with respect to the point $g(t) = g(0)$. The design of the mirror is such that in the limit $\Delta l_1 \downarrow o$ of the particles with wavelength $\lambda$ entering perpendicular to the mirror, only those particles are transmitted of which the reduced phase is equal to $\pm \delta$ while the angle quantum number is equal to s.

The angle quantum number s being defined by $s=1$, if the particle with respect to the symmetry of its wave function in the wave guide behaves as a fermion, and by $s=2$ if the particle with respect to the symmetry of its wave function in the wave guide behaves as a boson. The effect of a phase dependent mirror for non luxons is due to the quantum mechanical tunnel effect, for luxons that is not true. Such a mirror has the following property:

Let T be the transmittance of a phase dependent mirror and $\lambda_o$ the longest wavelength with $$\frac{dT}{d\lambda} = o \text{ and } \frac{d^2T}{d\lambda_2} > o.$$

Then we have for $\lambda/s \leq \Delta 1_1$ that $$\frac{dT}{d\lambda} = o$$

and for $\lambda/s > \Delta 1_1$ that $$\frac{dT}{d\lambda}(\lambda_o/n) = o \text{ and } \frac{d^2 T(\lambda_o/n)}{d\lambda} > o$$

where n is an integer.

Phase dependent mirrors have, among other, the following applicabilities:

1) As a filter in the communication technic. Radiation sources which differ only in phase can be distinguished and identified with the help of phase dependent filters.
2) As a filter for the protection against intense monochromatic radiation. This filter only transmits radiation of two given reduced phases. The rest is reflected and not absorbed, with the effect that this filter is suitable for very intensive radiation.
3) As a filter for maser or laser radiation. By applying this filter, which the phase of the radiation remains constant, which is of importance at the recording and display of holograms. Particularly for those holograms which are used for the machining of materials.
4) As a filter in robotics. With this filter one can detect precisely if a comparable second filter is in the proper position.
5) As a filter for electrons in a vacuum or in electric conductors.

In both cases, the wall of the cavity of which A is a cross section consists of an insulator, while in the second case, the cross section A consists of an electric conductor. With proper design, this filter causes the electric conductivity in the medium of the cavity at a sufficiently low temperature to have some relative maxima as a function of the temperature of the conducting electrons. This property makes the filter suitable to be used in switches and for energy transport.

6) As a part of a frequency duplicator. In this case two of these mirrors are situated on a straight line with a distance of a whole number of half wavelengths, of the radiation they transmit, from each other, while the phase of each of the mirrors in this case is equal to zero. Here the next rule is applicable: "The chance of frequency duplication is different from zero if there exists a point of time $t_1$ and a point of space $x_1$ such that $x_1$ is situated on the connection line of these mirrors while at the point of time $t_1$ the maximum of the wave function $\Psi_1$ of the particle that left the mirror $S_1$ coincides in $x_1$ with the minimum of the wave function $\Psi_2$ of the particle that left mirror $S_2$."

The above mentioned situation is illustrated in FIG. 71. There this effect is caused with the help of two coherent monochromatic particle sources $L_1$ and $L_2$. The chance at frequency duplication can be enhanced by putting between $S_1$ and $S_2$ a piece of H-mawag in an analogue way, as has been described in FIG. 72.

The above mentioned conditions: i) The phase of each of the mirrors is equal to zero. ii) The distance between the two mirrors is equal to a whole number of half de Broglie wavelengths do not apply if the particles, which cause the frequency duplication, have the property that if the maximum of the absolute value of their wave function $\Psi$ is in $x_1$ at the point of time t, then at the boundaries of the mirrors $\Psi_1(t_1)=\Psi_2(t_1)=o$ and $d\Psi_1(t_1)/(dx)=d\Psi_2(t_1)/(dx)=o$. In this case it is possible to realize a frequency duplicator like that one which has been sketched in the scheme in FIG. 72.

The parallel bundles $B_1$ and $B_2$ of particles of the same kind and the same de Broglie wavelength enter the mirrors $S_1$ and $S_2$ of H-mawag, which have such dimensions that they practically fully reflect these particles at an angle of incidence of $\pi/4$ radials, while they almost fully transmit particles with wavelength $\lambda/2$ at the same angle of incidence. In bundle $b_2$ at $F_2$ there may or may not be a phase regulator to vary the phase of the particles in bundle $B_2$ in the plane P.

The point $x_1$ wherein the frequency duplication occurs is, situated between the mirrors $S_1$ and $S_2$. In order to enhance the chance that frequency duplication will occur by preference one places between $S_1$ and $S_2$, a piece of H-mawag with such dimensions that its cutoff wavelength $\lambda_c$ obeys $\lambda_c \geq \lambda$, while the direction of the growing lines of the cavities in the H-mawag is parallel or antiparallel to the velocity of the particle entering H-mawag. The heartline L of the H-mawag coincides with the perpendicular connectionline of the mirror $S_o$ and the half transmitting mirror $S_3$. At the right-hand side of mirror $S_3$ the particles can be detected, which arose at the frequency duplication. If between $S_1$ and $S_2$ electrically charged particles arise, then those arisen particles which have a negative electric charge leave through the half transmitting mirror $S_3$ provided $S_o$, $S_1$, $S_2$ and $S_3$ have the proper electric charge.

3.5 Closed Mirrors

Closed mirrors are mirrors of H-mawag of which the cavities are closed at one side by a mirror, the so called closing mirror. Closed mirrors have the property that the length $|g^1(t_1)|$, of a growing line in an arbitrary unit cell of the mirror, reduces with an as large as possible whole number of de Broglie wavelengths of a particle moving in the cavity which is equal to $\alpha\lambda$, where $\alpha$ meets $o<2\leq 1$. Here we will treat the cases $\alpha=\frac{1}{4}$ and $\alpha=\frac{1}{2}$. In the first case we are dealing with $\frac{1}{2}\lambda$-mirrors in the second case with $\lambda$-mirrors. $\frac{1}{2}\lambda$ mirrors have the property that the particle after having been reflected against the closing mirror leaves the cavity with the same reduced phase with which it entered. It is also called "phase conjugated mirror". $\lambda$-mirrors have the property that the particle, after reflection against the closing mirror, leaves the mirror with a reduced phase which differs with $\pi$ of the reduced phase of the particle at the entering of the cavity.

Closed mirrors can be constructed of both two dimensional mawag and one dimensional mawag. Due to vibrations the length of a growing line of a closed mirror can be time dependent.

For some applications one can take advantage of that property. A case of special interest is when $g(t_1)$ is constant while the mirrors are constructed in one dimensional mawag and the choice $\lambda=\lambda_c$ is made, where $\lambda_c$ is the cutoff wavelength of the mawag. Phase dependent mirrors can also be constructed as closed mirrors. Of special interest are the cases when L is either a whole number of half wavelengths or a whole number of quarterly wavelengths of radiation entering the mirror and $\sigma=o$ 3.6. Superconductor of Electric Currents The property that mawag of proper dimensions can be used as a superconductor of electric currents is a direct consequence of the less than three dimensional character of the electron gas in mawag. Duo to this the zero point energy $U_o$ of the electrons, is not next to $U_o=o$ but next to $U_o=2h^2/(ma^2)$ where a is a characteristic dimension of the mawag. At the choice $a=2.45\times 10^{-9}$ m we find for a rectangular cross section of mawag that $U_o=1$ eV, while in that case, for instance for $C_u$, a is about ten times as large as the nearest neighbour distance of atoms. As a consequence at a sufficiently high value of $U_o$ the conduction electrons cannot be scattered by potential hills, "no potential hill rises above the conduction sea", and mawag behaves as a superconductor for electric currents. This phenomena occurs sooner at low temperature than at high temperature and sooner with 1-dimensional mawag than with 2-dimensional mawag. The appearance of superconduction is enhanced by the absence of crystal defects or other fixed high potential hills in mawag.

Matters having bulkmaterial being good conductors or good superconductors or conductors and a magnetic matter are preferably used for the manufacturing of mawag in order to make superconductors. If mawag is made with the help of a magnetic field then by meeting a certain condition a formula can be deduced for the radius of curvature r of the path of an electrically charged particle with charge q and mass mn that moves through the mawag. Let $v_\perp$ be the velocity of the electrically charged particle perpendicular to the magnetic field and $v_\parallel$ the velocity of that particle parallel to that magnetic field; $|v_\perp|>>|v_\parallel|$, h Planck's constant, n a positive integer, B the magnetic induction of the magnetic field wherein the electric particle is moving, creating r yielding $r \approx (nh/|(2\pi Bq)|)^{0.5}$ and $r=|mv/(Bq)|$ where $v=v_\perp^2+v_\parallel^2)^{0.5}$ and v is related with the temperature at the surface of mawag. By preference these values of r are chosen for the radius of a cross section of H-mawag, respectively for the radius of a cross section of a cavity in H-mawag. This way it is possible to let electrically charged particles move at the surface of a matter thus minimizing the chance that they will be scattered with the effect that the highest possible electric conductivity is obtained.

3.7 Radiation Absorbing Material

H-mawag that consists of wave guides which are closed at one side by a so called closing material are with a proper design suitable to function as a radiation absorbing material. For that purpose the cavities have such dimensions that a part, and for some applications an as large as possible a part, of the entering radiation with wavelength λ can penetrate in the cavities of H-mawag because the condition $\lambda \leq \lambda_c$ is met, where $\lambda_c$ is the cutoff wavelength of the H-mawag. The closing material is characterized by the property by having an as high as possible absorptance in the wavelength domain of the radiation entering the closing material.

That property can be achieved, although certainly not exclusively achieved, by realizing the closing material as a black body. One other method is to take a diffuse reflector as a closing material. If radiation with a narrow bandwidth, of which the largest wavelength is just below the cutoff wavelength of the cavity, enters the closing material, a great deal of absorption of that radiation will take place because after diffuse reflection that radiation for a large part would not fit in the wave guide any more. In FIG. 34 an arbitrary example is given of a longitudinal section of the inner wall of the cavity of a unit cell in which a diffuse reflector is situated.

3.8 Clothes

H-mawag can in the form of a screen be realized in clothes or be used as clothes. Especially useful is that appearance in which there is air in the cavities of H-mawag. This way it is possible that the screen is permeable for moisture and gases which ventilatesthrough the screen with effect that is suitable for clothes, blankets and mosquitonets. Here it is stressed that proper dimensions of the cavities are of essential importance for the function of clothes. For instance, if the cavities consist of splits with a width of 1.25 μm then practically the total energy of the solar spectrum is transmitted causing a roasting effect, if one enters the sunlight. Thus the need of heat in a present radiation field determines the dimensions of the unit cells in mawag which is used in clothes or is realized as clothes. For most applications in clothes a characteristic dimension of a hole in H-mawag will be greater than or equal to about 5 μm.

Attention is paid to a screen realized in clothes or used as clothes which protects against intense electromagnetic radiation or other radiation coming from intense fires or out of space.

Apart from the possibility of ventilation the screen has here the advantage that above the cutoff wavelength the quotient of the surface of H-mawag absorbing radiation and the surface of H-mawag reflecting radiation is much smaller than one, while for the conventional metal foil suits that quotient is equal to one. This has the effect that the surface to be cooled eventually is considerably smaller than for conventional close metal foil suits. The effectivity of the protection by the mawag can be enhanced by taking instead one screen various layers of screens stacked upon one another to be used in clothes or as clothes. By preference those layers are at least as possible in connection with each other by solids. That can be achieved by constructing a suit of mawag such that it can be blown up with for instance compressed air or compressed gas. This gives rise to three other favourable effects:

1) By the expansion of the gas or the air the body that has to be protected by the clothes is cooled.
2) The screen or screens are cooled since the compressed air or the compressed gas is let outwards.
3) By the expansion of the gases the joint surface of the body to be protected and the clothes is as small as possible with the effect that the protection against intense radiation is as good as possible.

3.9. Radiation Selective Screen

H-mawag can in the form of a screen be used as a radiation selective screen. Radiation selective screens are known from literature. In the European patent application 0 027 718 a selective screen is constructed as an optical upper layer of a bendable fibrous substrate with the effect that it becomes possible to absorb solar radiation selectively. Next to it a multi layer interference filter has been described. The use of interference filters is further known from the following Dutch patents, the numbers 77 11 668, 99640. 73 025 85, 6405561, 7807980 and 7410814.

The above mentioned selective screens all have the property that their spectral selective properties in the domain of the cutoff wavelength change gradually with the wavelength and that they practically cannot be used to control simultaneously the intensity of light behind the filter. Therefore there is no question of a sharply defined cutoff wavelength, but more of a gradually elapsing transition region. And there is also no question of a controllable intensity of light behind the filter. If one wishes the whole screen to be characterized by exactly one cutoff wavelength then the screen should be build up of specific unit cells having the same cutoff wavelength. Some examples of possible cross section of such a cell are shown in the FIGS. 1.1 through 1.10 and 1.13 and 1.14. The screen can be designed as an absorbing element, (see 3.7), as a reflecting element or as a reflecting and transmitting element or as a combination of the above mentioned properties.

In the first two cases the cavities are closed at one side while in the third case the cavities are constructed as through going holes. In all these three cases sometimes it is preferable to fill the cavities with a medium which is transparent for the proper radiation or to fix the cavities on a substrate.

The invention can be generalized by leaving out the condition that all specific unit cells have the same cutoff wavelength. This way it is possible to design screens which consist of various domains in which each has its own cutoff wavelength and it becomes possible to construct the various domains of the screen such that the cutoff wavelength $\lambda_c$ increases as a function of the distance to exactly one border of the screen. That border is preferably the lower border. This way it is possible, with the help of such a screen that has been constructed in such a way, that it can be rolled up, to achieve a roll screen that, depending upon the clouds, can transmit radiation selectively an optimum amount of light, since the colour temperature of the entering light varies with the clouds. In FIG. 35 such a screen has been sketched in main lines.

There, each of the horizontal regions $h_i, \ldots, h_n$ is characterized by its own cutoff wavelength $\lambda_{ci}$, such that $h_i$ corresponds with $\lambda_{ci}$. By preference these cavities are constructed in such a way that $\lambda_{c1} < \lambda_{c2} < \ldots \lambda_{ci} < \ldots < \lambda_{cn}$ is met. In FIG. 35 the case n=8 has been sketched. It should be noted that the screen can be constructed so that over distances greater than the smallest characteristic dimension of a unit cell it can be characterized by radii of curvature which are not necessarily infinite. By preference such a screen can be constructed such that it transmits as much radiation energy as possible or as much photons as possible. This effect sometimes can be achieved by constructing the screen so that all entering radiation enters perpendicular to the outer surface of the screen. For instance it can be used next to the focus or the focal plane of a parabolic mirror with the purpose to transmit as much entering radiation as possible and to reflect as few entering radiation as possible as well as to emit as few heat rays as possible.

In order to enhance reflection the outer wall of the surface of mawag can be provided with a layer c of a good conductor. In order to reduce back radiation effects the outer surface of the wall of the surface of mawag can be provided with a layer i of a good insulator. In FIG. 36 a longitudinal section of a unit cell is shown in which both the layer i and the layer c are deposited in a symmetrical construction. If desired that can also be achieved asymmetrically, while it is also possible to drop one or both of the layers i and c.

A vertical strip of the screen shown in FIG. 35 can be used as a spectrometer. In that case preferably the screen is unrollable and develops a rigid form. By choosing a very small width for each of the domains $h_i$ through $h_n$, a mini spectrometer can be achieved which is suitable to detect radiation which can be observed by the human eye.

Let $E(\lambda)\Delta\lambda$ be the amount of energy, from the wavelength domain $(\lambda-\Delta\lambda/2, \lambda+\Delta\lambda/2)$, entering such a spectrometer. Then it is possible to measure $E(\lambda)d\lambda$ with such a spectrometer and by a differential method it is also possible to measure $E(\lambda)\Delta\lambda$.

If one wants to use the roll screen to obtain at a clear sky the highest possible temperature in a room, then one has to construct the screen in such a way that all light entering the room enters the room via the screen. Also the screen has to be build of specific unit cells which all have the same cutoff wavelength and a cross section like that one in FIG. 1.9 or like that one in FIG. 1.10. These cells then have the property that $A_r/A_e$ is as small as possible without losing spectral selectivity. Condition for an as high as possible temperature is that radiation enters perpendicularly to the screen. It will then be clear that both the quotient $A_r/A_e$ and the value of the cutoff wavelength control the equilibrium temperature in the room. It is noticed that the screen, can function as a radiation selective screen with the effect that, also at an incidence of diffuse light, in the above mentioned room, depending on the design of the screen and the heat losses of the room, there still can be achieved a high equilibrium temperature in the said room.

If radiation enters a radiation selective screen by under an angle then the effective cutoff wavelength of a unit cell of that screen is $\lambda_c.\cos\gamma$, where $\lambda_c$ is the cutoff wavelength at perpendicular incidence to the screen (see FIG. 37).

This so called $\cos\gamma$ effect can be practically prevented in one direction by constructing the screen out of unit cells of which a cross section has a shape as shown in FIG. 1.1 or in FIG. 1.4, such that the length of a cross section of a unit cell is much greater than either $\frac{1}{2}\lambda_c$ or $\lambda_c$, if the screen is used for reflection or transmission of bosons or respectively fermions.

A certain form of construction of the roll screen, where the screen can be used under tensile tension, can have the characteristic of having a unit cell of the screen in cross section that has one of the shapes shown in FIG. 1.1 or in FIG. 1.4, and that between the cavities in the direction of the tensile strength material strips are situated. Perpendicular to the direction of the tensile strength material strips can also be present which have or have not been constructed in a "β-brick connection" where β yields $0 \leq \beta < 1$. The case β=0 is shown in FIG. 38 and the case β=½ in FIG. 39. It will be clear that also small domains with different values of β can exist next to one another.

In order to enhance the maximum allowable tensile strength the screen can be fixed at a substrate that depending upon the kind of application, can or can not be transparent for the incident radiation. In order to minimize back radiation effects one can construct the entrance of a unit cell with the help of one dimensional mawag. A cross section of the inner wall of cavity of a unit cell has then, for instance, the shape shown in FIG. 18. Other shapes and certainly not all of the cross sections of the inner wall of a unit cell are shown in the FIGS. 1.1 through 1.14 and in FIG. 2. In principle a cross section as sown in FIG. 2 can also be a cross section of a screen as a whole. It should be noticed that the screen transmits light diffusively with the effect that in front of a window it functions as a protection against looking in.

3.10 Storage Rings for Highly Energetic Particles

Storage rings for highly energetic particles consist of a vacuum in which electrically charged particles with charge q and restmass m, due to the presence of a magnetic field with magnetic induction B, pass through partly circular paths. In that magnetic field, electromagnetic radiation is emitted of which the wavelength $\lambda$ is inversely proportional with a positive integer n and proportional with the velocity of light c. $\lambda$ yields $\lambda = |2\pi \, mc/(nBq)|$.

By substituting $m=0.11\times10^{-31}$ kg or $1,673\times10^{-27}$ kg, $c=3\times10^8$ m/sec, b=1 Tesla, $q=16\times10^{-20}$ C, n=1 we find for an electron the value $\lambda=1.07\times10^{-2}$ m and for a proton $\lambda=1965\times10^{-2}$ m. These values of the wavelength are compared with the de Broglie wavelength $\lambda_b$ of an electron respectively a proton, according to the formula $\lambda_b=h/(mc)$. This way we find for an electron that $\lambda_b \approx 0.24\times10^{-11}$ m and for a proton $\lambda_b \approx 1.04\times10^{-15}$ m. Due to $\lambda_b/\lambda << 1$ it is possible to construct storage rings such that the charged particles inside H-mawag, which is characterized by exactly one cutoff wavelength $\lambda_c$, pass through partly circular paths while no radiation is emitted of which the wavelength $\lambda$ meets $\lambda > \lambda_c$. Therefore storage rings in accordance with the invention have less losses than comparable conventional storage rings. Not drawing to scale in FIG. 40 are five types of sketched cross sections of a storage ring which is in accordance with the invention.

If desired one can bring electric charge at the corner points a, b, c, and d of a cavity in H-mawag in order to enhance the bundle of electrically charged particles to pass through the centre of a cavity. That electric charge, situated at the corner points can be placed there in the form of point charges or in the form of linecharges. Notice that each of the cavities in H-mawag has to be pumped to a vacuum. It is clear that this invention can be generalized by dropping the condition of exactly one cutoff wavelength for the H-mawag. It will be clear that the invention can be generalized by allowing other kinds of cross sections than those which have been sketched in FIG. 40. Those cross sections are or are not a part of a wave guide of which the wall coincides with the wall of a band of Möbius of finite thickness. Preferably the walls of the cavities in H-mawag consist of a good electric conductor or a superconductor.

The invention can be generalized by allowing the walls of the cavities in the H-mawag, before the connections, which allow for these cavities to be pumped to a vacuum, to be made, which can be generated with the help of a simply closed growing line $g_o$, while the formula for $\phi$ in $S_o$ which has been deduced before is applicable. $\phi = m(n-1).2\pi/\cup$ yields.

3.11 Material With a Low Work Function

The low work function of the mawag is a direct consequence of the less than three dimensional character of mawag. This makes mawag suitable for various purposes. For instance as a catalyst in electronic tubes to provide for electrons or as one of the materials of a thermo-electric cell that is used to generate electricity or to measure temperature or to cool plates with the help of the Peltier-effect, or as one of the electrodes of an accumulator or of an electric battery. Now it is possible to construct both the electrodes of an accumulator or of an electric battery of the same kind of molecules, provided exactly one of these two electrodes consists of mawag. It is then clear that mawag can be used in principle for all applications of the Richardson-effect.

3.12 Thermal Insulator

The functionering of H-mawag as a thermal insulator can be illustrated best with H-mawag which consists totally of specific unit cells having all the same cutoff wavelength $\lambda_c$.

The fraction $A_r/A_e$ of the outer surface of a cross section of a unit cell can radiate outwards. An example of a cross section of a part of mawag is shown in FIG. 40. In that example the fraction $1-A_r/A_e$ of the outer surface radiates as a body which has the property that it does not emit radiation of wavelength $\lambda$, if $\lambda$ meets $\lambda > \lambda_{c1}$. The radiation current from the fraction $A_r/A_e$ of the outer surface of a unit cell can be reduced by making grooves in the cross sections of the unit cells. In FIG. 41 a cross section of a part of H-mawag is shown, which has been made near the outer surface of H-mawag. There, a situation has been created in which the fraction $A_r/A_e$ of the outer surface of a unit cell also does not radiate as a black body but as a body of which the spectrum of the emitted radiation can be characterized by a cutoff wavelength $\lambda_2$, which, in the example given in FIG. 42, is dependent of the thickness of the wall of the unit cell.

This way $\lambda_{c2} < \lambda_{c1}$ can be met with the effect that no part of the H-mawag emits as a black body. At a given temperature it radiates in a more narrow band than a black body while the point of maximum radiation intensity is situated for H-mawag at a larger wavelength than for a black body.

If one brings the thermal insulating screen into contact with the body that has to be insulated or if one places that screen on a short distance of that body, then no radiation will be emitted by the screen or transmitted with a wavelength above the largest cutoff wavelength of the screen. If such radiation is radiated by the body to be insulated than that radiation will be reflected by the insulating screen. Since the screen does not have the property to transform long waves into short waves, the body to be insulated, being in contact with the insulating screen, will loose less energy by radiation than in case of absence of the screen. This can be described with the help of the energy savings factor S, which is a function of the parameters $E(\lambda)$, $A_r$ and $A_e$ which have been defined in 3.9. The following formula yields:

$$S = \left( \int_o^{\lambda_{c2}} E(\lambda) \cdot (A_r/A_e) d\lambda + \int_o^{\lambda_{c2}} E(\lambda)(1 - (A_r/A_e) d\lambda) \right) / \int^{\infty} E(\lambda) \cdot A_e d\lambda$$

where S is the quotient of the power emitted if a screen is applied and the power emitted when no screen is applied.

To enhance the insulating effect N, screens can be placed parallel behind each other in order to insulate the body L as well as possible. In FIG. 43 the case n=3 has been sketched in various configurations. Preferably these screens are placed in such a way that their cutoff wavelength corresponding with the fraction $1-A_r/A_e$) of the surface of a cross section of unit cell, increases with the distance to the body to be insulated. Preferably these screens are situated at such a distance from each other that practically no shade will occur due to the diffraction properties of electromagnetic radiation.

In some applications one places preferably non transmitting screens between the parallel insulating screens of H-mawag in order that the fraction S is a product of factors which are all smaller than one, with the effect that a very small value of S can be achieved.

In some of these applications, for reasons of ventilation, it will be necessary to make holes in those for the rest non transmitting screens, which are preferably situated in such a way that the holes of one screen are at a one to one mapping on the other, for the rest non transmitting screen, have no overlap with the holes of that other screen.

Insulating screens of mawag can be applied in clothes, in insulation of the outer side of houses and buildings, on the glass envelope of a lightbulb in order to prevent heat losses with the effect that the efficiency of the lightbulb increases. It can also be used in cryogenic technic to avoid inflow of heat radiation and in the construction of ovens, furnaces and kilns to reduce radiation losses. It can be used on the inner wall as well as on the outer wall of an oven, furnace or kiln. Besides, it is suitable for insulation of heat pipes, swimming pools and heat containers.

3.13 Filament or Glowscreen

A glowscreen or filament can be constructed of H-mawag. In both cases an electric current causes the filament or the screen to glow. The advantage of H-mawag as a filament, with respect to the conventional filament, is that H-mawag, when heated, has a much narrower effective spectrum with the effect that at proper dimensioning practically no radiation is emitted which cannot be detected by the human eye. The efficiency of a bulb in which a glow screen or filament of H-mawag is situated is nearly 100%, while no complex and expensive ignition apparatus is required, like gasdischarge tubes which also have a lower efficiency.

As in the conventional filament H-mawag filament or glowscreen is provided of a layer to prevent atomizing of H-mawag. A glowscreen according to the invention has been sketched in FIG. 44. The domain I consists of H-mawag.

In domain II, the thickness of the material is either as equally thick as in domain I or it increases with the distance to the border of the regions I and II. When used for illumination purpose the filament or the glow screen are preferably situated in a space in which a protection gas is present in order to avoid as much as possible aging phenomena in H-mawag.

The invention can be generalized by dropping the condition that the cutoff wavelength has to coincide with the upperbound of the wavelength domain within which photons can be detected by the human eye. Other cutoff wavelengths can also be chosen with the effect that instance light sources can be made for ultra-violet light, for soft X-rays, for the infrared and the far infrared.

Due to the narrow spectrum the invention is especially suitable to be used as a part of a lightpump in lasers. This way a higher efficiency can be achieved.

3.14 Accelerator for Highly Energetic Electrically Charged Particles

An accelerator for highly energetic electrically charged particles in accordance with the invention differs to the conventional accelerators in the sense that in the said invention all particles move in H-mawag in which eventual electric point charges or linecharges are situated as described for instance in 3.10.

The cavities in the H-mawag consist of the best possible vacuum while the walls of these cavities preferably consist of super-conductors, which can coincide with the walls of bands of Möbius of finite thickness or not. This way one achieves that the efficiency of the invented accelerator is considerably greater than the efficiency of a comparable conventional accelerator.

This is due to the fact that undesired radiation losses can partly be avoided because the particle to be accelerated does not emit radiation of which the wavelength is larger than the largest cutoff wavelength of the H-mawag.

One realization of the accelerator in the said invention is such that the energy which is used to accelerate the electrically charged particles is provided by a laser or maser, L, which emits linear Polarized radiation of wavelength $\lambda$. This radiation enters perpendicular to a plane phase conjugated mirror $S_{21}$ which preferably has been constructed in the manner described in 3.5. The distance between $S_2$ and the reflecting surface of the half transmitting mirror $S_1$ of the laser or maser, is equal to a whole number of values of $\lambda/2$. Let c be the velocity of light between the mirrors $S_1$ and $S_2$, then let there exist parallel to the surface of $S_2$ parallel domains of width $\lambda/2$ in which the direction of the electric field strength $\vec{E}$, which is caused by a photon from a maser or laser, during $\lambda/(2c)$ seconds does not change its direction. In two of these parallel neighboring domains, which can be arbitrarity chosen, the direction of the electric fieldstrength is opposite. (See FIG. 45). By shooting, an either positive or negative electrically charged particle in the space between $S_1$ and $S_2$, respectively parallel or anti-parallel to $\vec{E}$, that charged particle is accelerated in either parallel or anti-parallel direction to $\vec{E}$, by absorbing an even number of photon of the radiation from the maser or laser. This way the law of conservation of momentum can be obeyed and the charged electric particle is accelerated precisely parallel or respectively precisely anti-parallel to $\vec{E}$.

Accelerators according to the invention can be used for scientific experiments. They also can function as a part of a propulsion system, whereat the reaction force extended by the accelerated particles is used to propel a vehicle or rocket.

The can also be used to produce synchrotron radiation for research purposes. That can be realized by sending, after acceleration, charged particles through a magnetic field.

3.15 Artificial Atom or Ion

Figure 47:
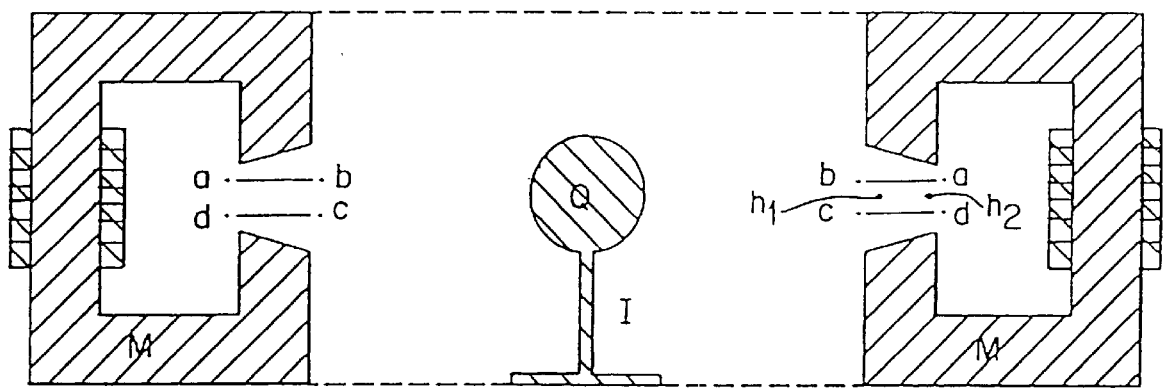
FIG. 47 shows, nor to scale, a cross section of an artificial atom or ion.

An artificial atom or ion, according to the invention, consists of a positive electric charge where inside of H-mawag, a preferably circular circuit is situated. A cross section of the boundary of the inner wall of a cavity in that H-mawag has for instance the shape which is shown in FIG. 46. If desired, negative pointcharges are situated on the points a, b, c and d, which are or are not a part of negative line charges of magnitude, respectively $-Qa$, $-Qb$, $-Qc$ and $-Qd$, in order to provide that the electrons which move in the cavity of the H-mawag, do not come into contact with the wall of the H-mawag. The rim of the inner wall of a cavity coincides with or does not coincide with the wall of a band of Möbius of finite thickness. In FIG. 47 is shown, not to scale, a cross section of an artificial atom or ion. In the center on the insulator I, a positively charged sphere with charge Q is situated. The whole is situated in the best possible vacuum. The electrons are kept on their track inside the H-mawag due to an equilibrium of the following forces; the attraction force of the positive charge Q, the centrifugal force, if desired, the repelling force of the charges $-Qa$, $-Qb$, $-Qc$ and $-Qd$ and, if desired, a Lorentz force which is exercised by means of a magnet M. In the equilibrium situation of the above mentioned forces the electrons on their track around the charge Q can not emit radiation because the to be emitted radiation would have a wavelength which would be larger than the cutoff wavelength which corresponds with the smaller characteristic dimension of the H-mawag. It is of importance that the walls of the H-mawag consist of a superconductor or a good conductor.

The above described artificial atom or ion can have some macroscopic dimensions.

For, if you let E be the permittivity of the vacuum, m the restmass of an electron, R the radius of the nucleus of the "atom" or "ion". R+r the distance of the electron to the center of the "atom" or "ion" and v the velocity of an electron that moves around the nucleus of the "atom" or "ion", than in absence of an external magnetic field we have for the potential U of an electrically charged body $U=Q/(4\pi ER)$ and at equilibrium of Conlomb force and centrifugal force $Q/((4\pi E)(R+r)^2)=mv^2/(R+r)$. By substituting $U=4V$, $r\approx 0m$, $R=1$ m and $m=9,11\times 10^{31}$ kg we find that V yields $V\approx 8\times 10^5$ m/sec. The velocity is dependent of the distance of the electron to the centre of the nucleus. Here the angular velocity defined by $w=v/(R+r)$ is constant. By analogue if the spherical charge Q is replaced by a line charge density p then in the equilibrium situation in absence of external magnetic fields, $p/(2\pi E(R+r))=mv^2/(R+r)$ has to be obeyed. The velocity of an electron around the "nucleus" is in the case independent of space coordinates. At 3.6 an estimation has been made of characteristic dimension of the H-mawag which shows of which order of magnitude the dimension must be in order so that one can expect quantum effects.

In practice the charge Q is kept on a constant value with the help of a charge generator and a feedback mechanism.

Electromagnetic radiation can be obtained by applying a pulsed electric field between the electrodes $h_1$ and $h_2$. (See FIG. 47).

The in the above mentioned way obtained electromagnetic radiation can in principle also be used for the creation of coherent monochromatic radiation, provided the charged particle between $h_1$ and $h_2$ jump over into an orbit in which they can remain for a long period of time before that they fall back into their previous orbit. Electromagnetic radiation can also be created by changing the value of Q or the value of the magnetic induction B, which is caused by the magnet M. It is clear that the invention can be generalized in many ways. Some and certainly not all possibilities are the following.

Figure 48A:
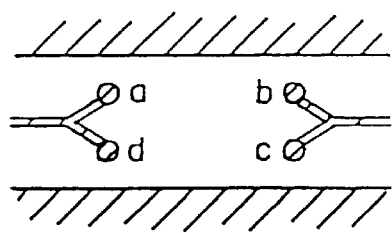
FIGS. 48A–48C show a possible configuration for line charges.
Figure 48B:
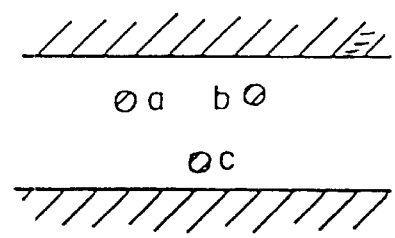
Figure 48C:
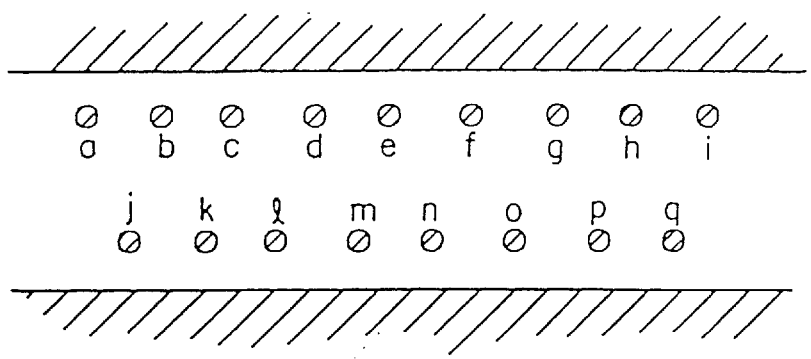
Figure 49:
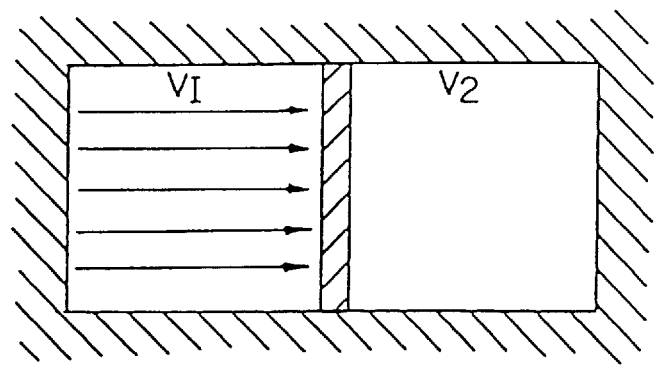
FIG. 49 shows a reaction wall according to the invention.

The signs of the charges can be changed, the spherical charge Q can be replaced by a line charge Q or by a chargedistribution of another geometric form. The circular circuit can be replaced by a circuit of which the heartline is an arbitrary simply closed curve, provided the geometry of the chargedistribution of Q and of the aided charges Qa, Qb, Qc and Qd and of the magnetic field are adapted in such way that the charge particles can move along the above mentioned simply closed curve. Instead of the proposed configurations of point charges and line charges there are also configurations possible for linecharges, as those which have been sketched in FIG. 48. There the line charges are situated practically in the centre of the cavity of the H-mawag. It will be clear that the invention also can be generalized by choosing in a cross section of the H-mawag another configuration than those which are shown in the FIGS. 46 through 48 or by choosing other configurations for the line charges or for the point charges Qa, Qb, Qc and Qd or by changing the number of pointcharges or the number of linecharges.

There are various applicabilities for the artificial atom or ion, for instance, as an apparatus for scientific research, storage ring for high energetic, electrically charged particles, part of an accelerator for high energetic particles as described at 3.14. The artificial atom or ion can also be used to generate electromagnetic radiation of which the wavelength $\lambda$ obeys $\lambda \leq \lambda_c$. That radiation can be generated by putting in an electric potential difference over a cross section of a mawag circuit, for instance between $h_1$ and $h_2$. (See FIG. 47). This way some potential energy qV of the charge in the circuit can be transformed into electromagnetic radiation energy. Then $qV=h\nu$ and $\lambda=c/\nu \leq \lambda_c$, where $\nu$ is the frequency of the light to be emitted, q is the electric charge of the particle and h is Planck's constant. Preferably as many electrons as possible have to take the quantum jump $h\nu$ in order to achieve the most intense lightpulse.

In order to avoid undesired sparking, the points $h_1$ and $h_2$ are preferably situated at that part of the circuit where the line charges $-Qa$ through $-Qd$, are absent.

3.16 Reactionwall

Figure 50:
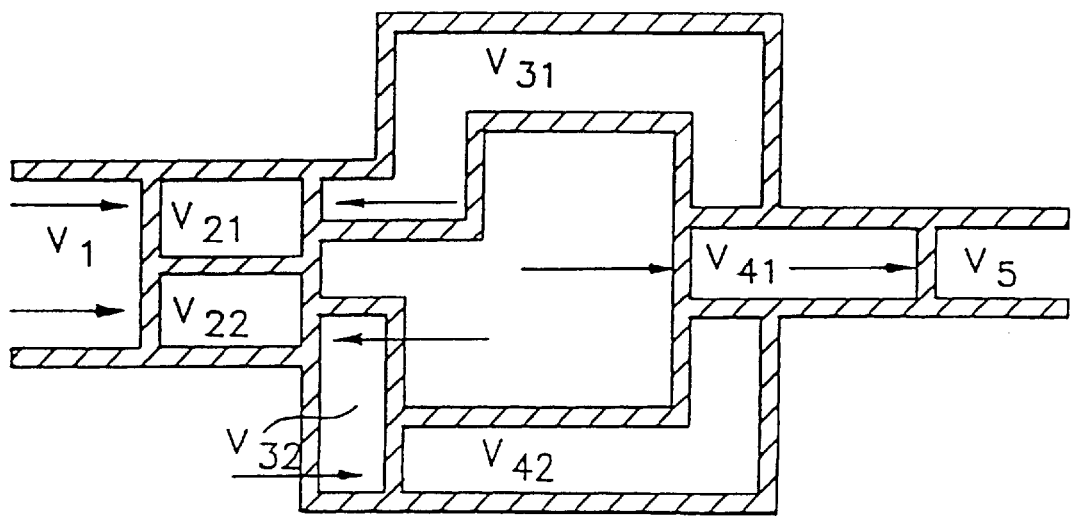
FIG. 50 shows an example of "reactiontree."

The reactionwall described here is a kind of "flow through catalyst". The reaction wall is a separation wall between two spaces where one has a volume $V_1$ and the other a volume $V_2$. The reactionwall consists of H-mawag. In volume $V_1$, there is an effective pressure with respect to $V_2$. By this pressure difference molecules flow from $V_1$ to $V_2$. If -possible the H-mawag has been, designed in such a way that these molecules bring these cavities into resonance. The cavities have been designed so that the difference between two energy levels of a particle in a cavity corresponds exactly with the energy required to either bind the molecules in volume $V_1$ with each other or to disintegrate them. Such a particle can, depending upon the desired reaction, be a photon, an electron, an atom or a molecule, an elementary particle or another particle. Due to the pressure difference between $V_1$ and $V_2$ the reaction-or dissociation products flow to $V_2$. From there they are transported. If one does not succeed in bringing the cavity to resonance by the molecules in order that a reaction or dissociation occurs, then one can bring a cavity in resonance with a bundle of coherent monochromatic particles, e.g. photons. Such a situation has been sketched in FIG. 50. There, preferably, the radiation enters the cavity either parallel or anti-parallel to the growing line of the shown cavity. In FIG. 50 the radiation enters the reactionwall via volume 1 in order to enhance the chance that a reaction will take place outside the separation wall. If for some reason it is undesired that a reaction occurs in $V_1$ then, the electromagnetic radiation can enter the separationwall also via volume $V_2$.

The invention can be generalized as follows. The radiation can be focused on either a part of the reactionwall, instead of the whole wall, or precisely on the entrances of a number of cavities. The volume $V_2$ can be split according to $$V_2 = \bigcup_{i=1}^{N} V_{2i},$$

where N is a positive integer an the volumes $V_{2i}$ are all disjunct and have a common separationwall with $V_1$ which can or can not function as a reaction wall.

Each of the wave guides in the reaction walls can be dimensioned differently and on each of these walls can enter coherent radiation preferably in the cavities. This radiation is preferably monochromatic while its wavelength may differ from reaction wall to reaction wall depending upon the desired reaction.

To the volume $V_j$ the volume $V_{jn}$ can be build where j is a positive integer. Eventually the walls of the volume $V_{jn}$ are constructed of reactionwalls, with the effect that, finally, for a large value of j, a so called "reactiontree" has arisen.

In FIG. 51 the case j=5 has been sketched. There, the walls between $V_{31}$ and $V_{41}$ and between $V_{41}$ and $V_{42}$ do not function as reactionwalls. In a reactiontree the pressure in the volume $V_j$ is greater than the pressure in the volume $V_{j+1}$.

An advantage of the flow through catalyst with respect to other catalysts is the fact that the flow through catalyst can function at lower pressure. Because of the resonance in the cavity, the chance that a reaction occurs is enhanced. Thus the reaction wall can function as a catalyst. In the same way as in 3.2., some reactions can be enhanced by bringing the H-mawag at a negative electric potential.

It will be clear that the reactionwall can also function as a catalyst if the cavities of the H-mawag are closed on one side, for instance at the side of volume $V_2$. In this case one or more cavities in the H-mawag are radiated by coherent radiation, which preferably is monochromatic and of which a photon has an energy which is qual of the energylevel difference of two energylevels of a particle in a resonance cavity.

It is noticed that the invention can be generalized by either providing or not providing each volume $V_j$ of one or more entrances and an exit, which can be used for the supply respectively the transport of particles.

3.17 Spectrometer

A spectrometer, according to the invention, consists of a rigid screen of H-mawag, which wholly consists of one type of unit cells which has been mounted on planefilling. These unit cells belong preferably to one of the kinds shown in the FIGS. 1.1, 1.4 and 1.7. The screen S is characterized by only one cutoff wavelength $\lambda_c$ and is mounted on an axis which is parallel to the reflecting surface of the screen. The axis A is parallel to a characteristic dimension of a unit cell of the screen.

The H-mawag has been designed so that the walls of the unit cells are perpendicular to the outersurface of the screen. The axis A is perpendicular to the plane of incidence of the radiation entering the screen. Let j be the angle of incidence of the radiation entering the screen, then the effective cutoff wavelength $\lambda_{ce}$ obeys $\lambda_{ce}=\lambda_c.\cos\gamma$. Therefore by rotating the axis A the effective cutoff wavelength is changed. Radiation of wavelength $\lambda$ obeying $\lambda \leq \lambda_{ce}$ is practically fully transmitted by the screen while radiation obeying $\lambda > \lambda_{ce}$ is practically fully reflected. In this way it is possible with the radiation sensitive cells $C_1$ and $C_2$ to measure both the total power $R(\lambda_{ce})$ of the reflected radiation and the total power $T(\lambda_{ce})$ of the radiation transmitted by the screen.

Let P be the power of the radiation entering the screen then $$T(\lambda_{ce}) = \int_o^{\lambda_{ce}} (dP/(d\lambda)) \cdot d\lambda \text{ and}$$

$$R(\lambda_{ce}) = \lim \varepsilon \downarrow 0 \int_{\lambda_{ce}+\varepsilon}^{\infty} (dP/(d\lambda))d\lambda$$

Due to $\lambda_{ce}\lambda_c \cdot \cos\gamma$, $T(\lambda_{ce})$ and $R(\lambda_{ce})$ can be measured by variation of $\gamma$ with the effect that $dp(\lambda)/(d\lambda)$ can be calculated In a certain construction form of the spectrometer the screen S is brought to vibration. Let $\omega$ be the circle frequency of that vibration, a the amplitude, $j_o$ the equilibrium angle, so that $j=j_o + a \sin \omega t$ yields. The part of $T(\lambda_{ce})$, which by influence of this vibration becomes time dependent is called $\Delta T(\lambda_{ce})$. With the help of the parameter $\Delta\lambda$ defined by $\Delta\lambda = \lambda_c (\cos\gamma - \cos\gamma_o)$, the quantity $\Delta T(\lambda_{ce})$ can be expressed by $\Delta T(\lambda_{ce}) = (dP/(d\lambda)) \cdot \Delta\lambda$ if $\Delta\lambda \leq o$ and $\Delta T(\lambda_{ce}) = 0$ if $\Delta\lambda > 0$ By analogue we have $\Delta R(\lambda_{ce}) = (dP/(d\lambda)) \cdot \Delta\lambda$ if $\Delta\lambda > 0$ and $\Delta R(\lambda_{ce}) = 0$ if $\Delta\lambda < 0$.

In both cases $\Delta\lambda = -\lambda_c \cdot a \sin \gamma_o \sin \omega t$ yields. If one takes for both $C_1$ and $C_2$ radiation sensitive cells of which the excit voltage at a given wavelength $\lambda$ of the radiation is proportional with the intensity of the radiation entering such a cell then $C_1$ and $C_2$ can be connected in a series. Then for $\Delta V$ the sum of the electric voltages caused by the vibration, $\Delta V = -C_o(dP/(d\lambda))\lambda_c \cdot a \sin \gamma_o \cdot \sin \omega t$ where $C_o$ is an instrumental constant.

The signal $\Delta V$ can be amplified very well with the effect that weak radiation spectra can be detected. In FIG. 51 a longitudinal section of this spectrometer is shown and in FIG. 52 a part of that spectrometer has been sketched in perspective.

The invention can be generalized in many ways. Some of these generalizations, but certainly not all will be mentioned below. The vibration of sin $\omega$t can be generalized to a sin ($\omega$t+$\phi$).

This vibration can be realized by acoustic means, electromagnetic means, mechanic means or a combination of these methods. One of the cells $C_1$ and $C_2$ can be left out. The cells $C_1$ and $C_2$ are situated in the plane of incidence of the radiation. It can be measured with an angle gomiometer which may or may not be a regular part of the spectrometer. $C_1$ may or may not be attained by the screen. In some cases, if desired, the radiation can be focused on $C_1$ or $C_2$ with the help of lenses.

The spectrometer of the invention is distinguished of the grid-spectrograph by its greater solution power, by the absence of overlapping spectra and by the fact that contrary to the grid-spectrograph, practically 100% of the radiation to be detected can be used for measuring purposes.

The spectrometer of the invention is distinguished of the prism-spectrograph by its greater solution power and by the fact that a larger part of the wavelength domain of interest can be measured practically free of losses.

The vibrating screen makes the application of choppers for amplifying purposes superfluous. Besides, more radiation can be used for the measurements than when choppers are applied.

3.18 Thermo-electric Cell

In this patent application some but certainly not all kinds of thermoelectric cells, which can be constructed by using H-mawag, will be described. Type I is identical with the conventional types of thermo-electric cells apart from the fact that the hot joint is partly or as a whole enveloped by H-mawag in order to minimize back radiation effects, in order for the temperature of the hot joint to be the highest. That H-mawag can be constructed in one of the ways which are described in 3.9.

There, the H-mawag may or may not be in direct contact with the hot joint. H-mawag can also be connected with the hot joint via a thermal insulator such as air or a vacuum. In order to enhance radiation-emitting effects and to achieve the lowest possible temperature of the cold joint of type I thermo-electric cell, it may or may not be in thermal contact with a body that radiates as a black body. In FIG. 54 some construction forms of a cross section of the hot joint of a thermocouple of the invention are shown. There 1 symbolizes H-mawag, 2 precisely one of the materials which are used to generate thermo-voltage and 3. a material with a very low emiscivity in the temperature domain in which the hot joint of the thermo-electric cell functions. These construction forms can all be generalized by dropping the condition that the materials 1 and 2, and or 1 and 3, and or 2 and 3 are in direct contact with each other. FIG. 54 can also be used to describe a cross section of a cold joint of the thermo-electric cell. In that case 1 and 3 symbolize materials which practically radiate according to a black body and symbolizes 2 precisely one of the materials which are used to generate thermo-voltage. In FIG. 55 another constructionform of a cross section of a cold joint is shown. If a number of thermo-electric cell are connected in series it is also possible to bring the H-mawag in various layers, which are preferably well insulated from each other, around the hot joints of these thermo-electric cell. Preferably, these layers are designed so that every layer has its own cutoff wavelength and that the cutoff wavelength increases outwards starting at the hot joint, in order to minimize back radiation effects and to provide the temperature of the hot joints is as high as possible. These back radiation effects can also be minimized by construction the H-mawag in one of the ways describe in 3.9.

Figure 56:
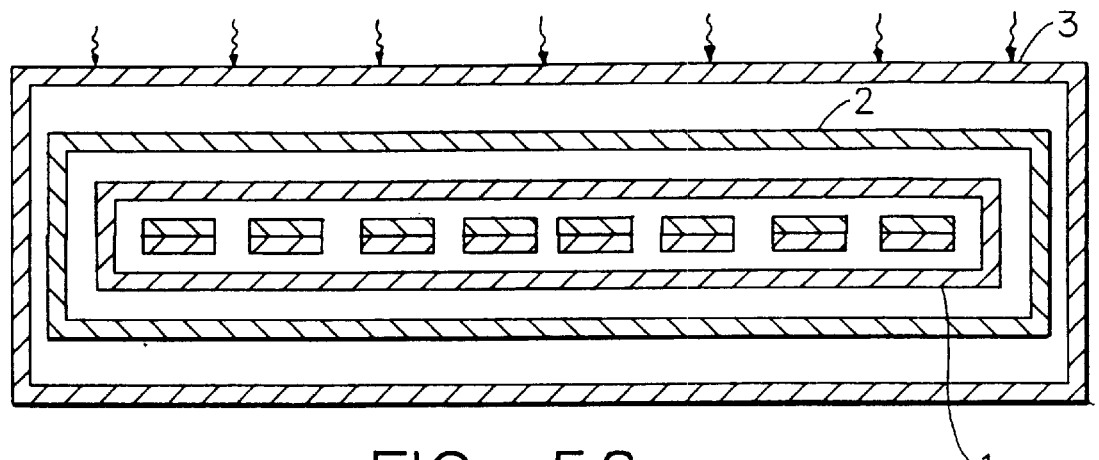
FIG. 56 shows a cross section of the hot joints of eight in series connected thermoelectric cells, which, according to the invention, are surrounded by three layers of R-mawag.

Not drawn to scale is, in FIG. 56, a cross section of the hot joints of eight in series connected thermo-electric cell, which according to the invention, are surrounded by three layers of H-mawag, the layers 1, 2 and 3. These layers are designed such that the cutoff wavelength of layer i is equal to $\lambda_i$ and that $\lambda_i < \lambda_{i+1}$ is obeyed. The invention can be generalized by dropping the condition $i \leq 2$ or by changing the number of thermo-electric cell. Type II thermo-electric cell is identical with type I thermo-electric cell apart from the fact that the material with the lowest work function, that is a part of the thermo-electric cell, is replaced by H-mawag. Type III is identical with type I apart from the fact that the two materials which are used to realize thermo-voltage, are replaced by two materials which both consist of mawag and which differ mawag-dimension. To avoid corrosion, if there is a risk of it, the cavities of the H-mawag, (which is used for the construction of a thermo-element) should be filled preferably with a radiation transmitting insulator, for instance quartz glass or another insulator. Preferably an insulator that absorbs a relatively low amount of radiation in the wavelength domain of the radiation entering the thermo-electric cell. The advantage of type 1 thermo-electric cell with respect to the conventional thermo-couple is that the hot joint can achieve higher temperatures at an equal radiation input. Therefore the radiation intensity can be measured with greater accuracy and, if the thermo-electric cell is used for the generating of electricity or for the efficiency is higher than if conventional thermo-electric cell would have been used.

The advantage of type II thermo-electric cell with respect to a conventional thermo-electric cell is that it contains the advantage of type I thermo-electric cell with respect of the conventional thermo-electric cell.

The advantage of type II thermo-electric cell with respect to type I thermo-electric cell is the fact that at a given radiation input thermo-voltage of a type II thermo-electric cell is greater than the thermo-voltage of a comparable type I thermo-electric cell. This is achieved by making a suitable choice of the H-mawag which is one of the materials causing the thermo-voltage.

The advantage of type III thermo-electric cell with respect of a conventional thermo-electric cell is that it contains the advantage of type I thermo-electric cell with respect to a conventional thermo-electric cell. The advantage of type III thermo-electric cell with respect to the type II thermo-electric cell is that one can use precisely one basic material, for instance gold or platinum, to construct a thermo-electric cell. This way many corrosion problems can be avoided.

3.19. Radiation-element

A radiation element according to the invention is used to transform electro-magnetic energy into electric energy. There are various types radiation-elements. Type I consist of a half transmitting mirror $S_1$ and a phase conjugated mirror $S_2$ of which the reflecting surfaces are parallel with each other and are situated at a distance from each other of a whole number of half wavelengths, $\lambda/2$, of the entering radiation. Between these screens there are thin radiation transmitting screens which are made of an electric insulator. The thickness of these screens is small with resect to $\lambda/2$ while the surfaces of these screens are parallel to both $S_1$ and $S_2$. The symmetry planes of these surfaces are situated at a distance from each other which is equal to a whole number times $\lambda/2$. Between the radiation transmitting screens is a medium M with free electric charges which is at least partly transparent for the entering radiation. Medium M is, for instance, a liquid in which ions are in solution. This liquid is a part of an electric circuit that has been constructed so that the spaces between the insulating plates from an electric point of view are connected in series.

Due to the absorption of radiation by the free charge carriers, which are in the medium between the screens, an electric current starts to flow within the circuit. The magnitude of this electric current is as great as possible if there is only one type of charge carriers, for instance, electrons only or positive ions only. If this condition can not be met then preferably the product of the concentration of one type of charge carriers and the mobility of these charge carriers should be much greater than that one of the remaining charge carriers.

Figure 57:
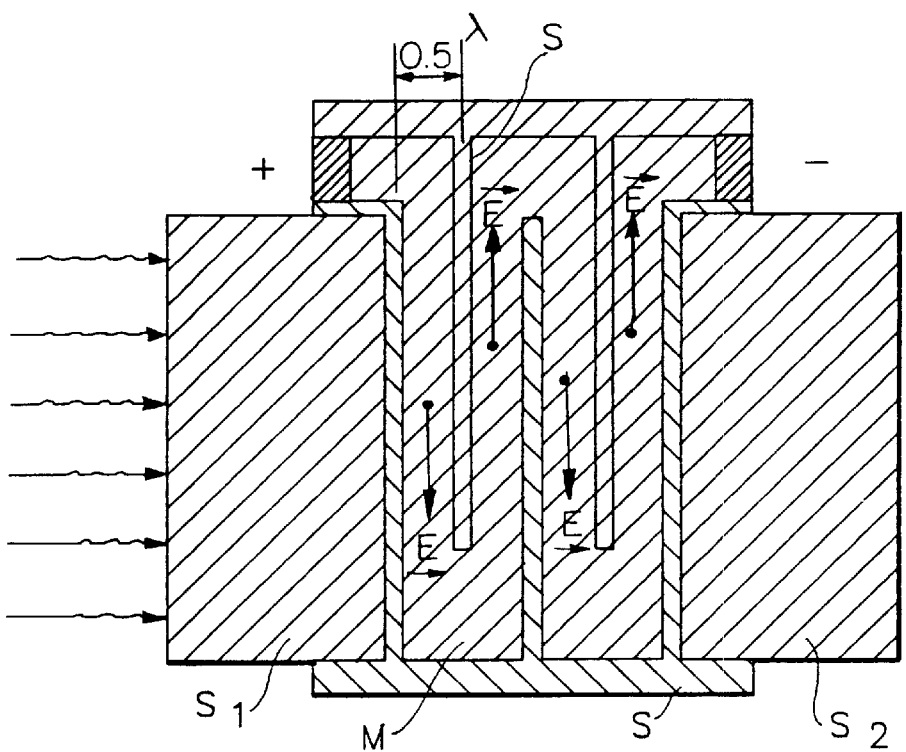
FIG. 57 shows, not drawn to scale, a cross section of a radiation-element according to the invention.
Figure 58A:
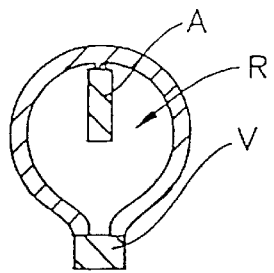
FIGS. 58A–58D show some examples of various cross sections of floating elements in air.
Figure 58B:
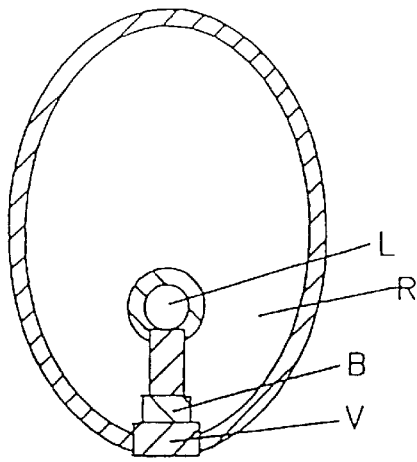
Figure 58C:
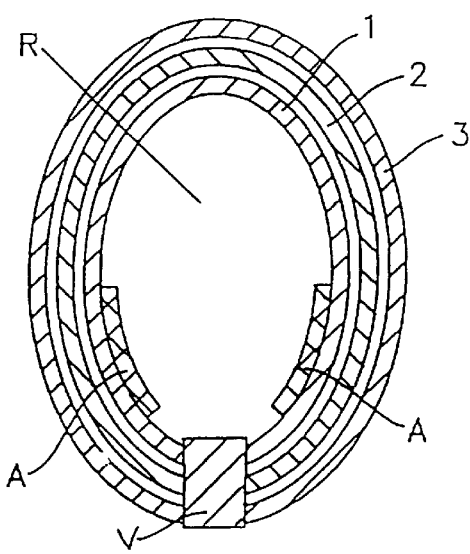
Figure 58D:
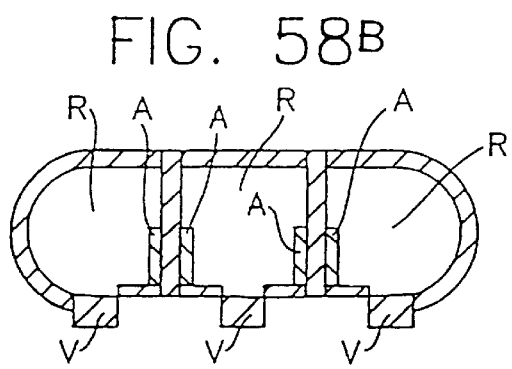

The function of this radiation element is based on the same principle as the function of the accelerator shown in FIG. 45. Not drawn to scale, a cross section of a radiation-element according to the invention is shown in FIG. 57. There the + sign and the − sign symbolize the anode and the cathode respectively. These electrodes can change their function continuously depending on the phase of the entering radiation.

3.20. Floating-element

Floating-elements are known. In aviation one knows the Zeppelin, in advertising the airballoon and in navigation, buoys and floating elements for nets. The Zeppelin and the airballoon have the disadvantage that they are filled with the expensive gas helium or with flammable gases, or with hot air created by expensive burners which consume fuel which is not free of charge. Floating-elements according to the invention, do not have these disadvantages also. In this patent application, floating-elements in water are discussed which function outside the navigation and the fishery. They are used to allow for an effective heating of deep water while storaging that hot water at the same time. Floating-elements according to the invention can, depending on their construction, be applied in agriculture, in behalf of shadefunctionering, in the electricity production in behalf of the placing of solar cells or thermo-elements in the sunshine or in behalf of the transport of hot air. They can also be used for the production and storage of warm water.

A floating element for floating on air consists according to the invention of a closed space R of which the wall wholly or partly comprise of H-mawag which is transparent for radiation and wherein radiation absorbing material A, preferably of the kind described in 3.7, is situated. The function of that material is to absorb the radiation entering R via the cavities in the H-mawag, in order to heat the air in R. Then this air will expand and will partly leave the space R via a valve V in the wall of R or via the cavities in the H-mawag. This way a floating element arises of which the upward force can be described with the Law of Archimedes. If a certain percentage of the air consists of $CO_2$ or another radiation absorbing gas then the above mentioned absorbing material can be left out. It is noticed that the floating-element also functions at an incidence of diffused light that can come from either the earth or the sun or the moon. In the latter case, much attention has to be paid to the insulation of the space R. In that case, the wall of R consists for instance of more than one parallel layer of H-mawag in the same way as the insulation of the thermo-element which is described in 3.18. It can also be constructed of a layer which does not consists of H-mawag but is parallel with the H-mawag in the wall of R. This layer transmits visible light and preferably reflects infrared light. It is also possible to fit in the space R such that in R a lightbulb L is situated which emits much infrared light which heats the air in R. That lightbulb can be connected to either batteries, an electric generator or to the electricity network. In the first two cases, if desired, the floating-element can move over large distances. In the third case it cannot move over large distances. Preferably the lightbulb is situated at the coldest place, for instance at the lower side of the floating element and preferably it radiates as little as possible perpendicular to the wall of R. If desired, it can illuminate the above mentioned absorbing material in R.

The floating-element that floats due to a lightbulb is very suitable for advertising purposes. Letters and figures can be made by putting coverings of light absorbing or reflecting material on the wall of R which consists of H-mawag. Figures and letters can also be made by variation of the characteristic dimension(s) of the H-mawag which is situated in the wall of R. This way for instance letters and figures can be distinguished from their background by their colour. The property of a floating-element that moves under the influence of the wind, attracting attention, makes such an element very suitable for advertising purposes. In FIG. 58 some examples of various cross sections of floating-elements in air are shown. In the FIGS. 58.1 through 58.4 the tethers which are required to keep the lumber or to keep the floating-elements at their place, are left out.

In FIG. 58.2 B symbolizes an electric battery. In FIG. 58.3 the absorbing material A is fixed at the inner side of the wall at the lower side of the space R. That side can be used because the rest of the inner wall of R radiates diffusely. In this cross section, the two H-mawag layers, the layers 2 and 3, are also used as insulation layers. If desired the layers 1, 2 and 3 can be mutually connected.

FIG. 58.4 shows a cross section of a floating element that consists of a number of identical floating elements which are attached to each other in order to cause, with the fewest material, the most shade and to minimize the chance that in a collision with birds, meteors or bullets the floating-element is destroyed.

Floating-elements as shown in FIG. 58.4 or a generalization of these elements, are very suitable to be used to keep plates with solar cells in the air.

Figure 59:
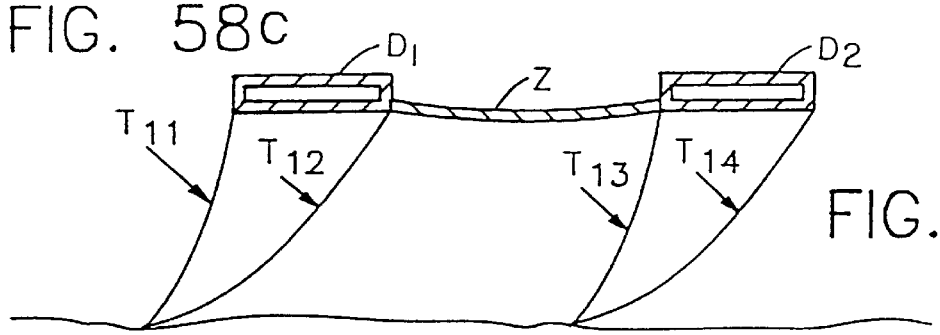
FIG. 59 is a cross section of a floating element suitable to keep plates with solar cells in the air.

A cross section of a situation in which this has been realized is shown in FIG. 59. In that figure, $D_1$ and $D_2$ are floating-elements, elements, $T_{11}$ and $T_{12}$ are tethers to keep $D_1$ at its place and which can be eventually used as an attachable for electric wires which have to transport the electricity generated by the solar cells, $\phi$. $T_{21}$ and $T_{22}$ have a similar function as $T_{11}$ and $T_{12}$. The situation shown in FIG. 59 is also very suitable for the creation of shade which is of importance for applications in agriculture, horticulture and forestry. In these cases, $\phi$ symbolizes a sunshade.

The flying of a floating-element can be realized by pumping air or gas in the space R until a certain pressure P has been achieved and by adjusting the valve such that air or gas is let out if the pressure in R becomes greater than $P_2$ while $P_2 \geq P_1$ is met. Another possibility to fly the floating-element is to hang it in such a way that R takes up at least 80% of its maximum volume and preferably even more.

A floating-element, as has been sketched as one of the floating-elements connected in parallel, as shown in FIG. 58.4, can be used for the generation and transport of warm air. Therefor at one end of the floating-element, an opening I has been made for the air inlet, while at the other end an opening U has been made as an outlet for the heated air.

Figure 60:
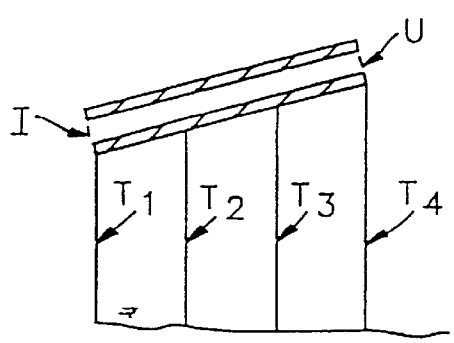
FIG. 60 shows a longitudinal section of a floating element in which a ventilator can be left out, where the hot air in an opening for the air inlet has a greater potential energy than in an opening made as an outlet for the heated air.

At I or at U a ventilator has been placed for the transport of the air from I to U. In a proper design this ventilator can be left out if the hot air in I has a greater potential energy then in U. Such a situation is shown in FIG. 60 where a longitudinal section of such a floating-element is shown. There, the bottom of the floating-element and eventually a part of the side-piece, is rather rigid while the upper side and at least a part of the side-piece consists of H-mawag which is transparent for solar radiation. The tethers $T_1$ through $T_4$ are attached such that the use of a ventilator is not necessary. These tethers can be left out if the floating-element can in one way or another be rigidly attached along the straight line IU.

Figure 61:
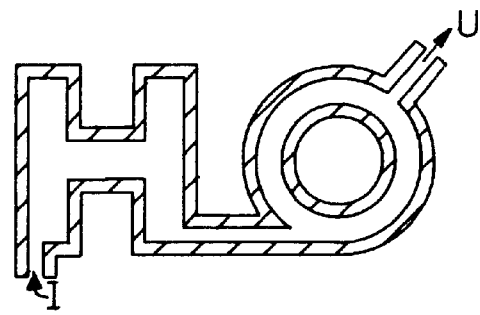
FIG. 61 shows a method of making floating elements suitable for advertising purposes.

In FIG. 60 the heart line of the floating-element has the form of a straight line segment. The invention can be generalized as such that the heartline is no longer a straight line segment. Thereto the condition that the hot air at the inlet I has a greater potential energy than at the outlet U, has to be met. At I, one preferably chooses the flow resistance for inflowing gases or air smaller than for outflowing gases or air. At U the situation is reversed. In FIG. 61 the heartline of the flowing-element has the shape of the word HO, which illustrates another method of making floating-elements suitable for advertising purposes. In the FIG. 59 through 61 the absorbing material has not been sketched but is in reality present in the invention. Not drawn to scale, a cross section of an installation for the heating of water and the storage of warm water has been sketched in FIG. 62. In this example, the floating-element consists of four identical parts which are connected in parallel. The horizontal layers $L_1$ through $L_n$ consist of H-mawag and have the function of transmitting most of the entering light. The horizontal layer $L_{n+1}$ consists of H-mawag which is transparent for very short electromagnetic waves and has the function of reflecting most of the entering radiation. The side walls of the compartments 1 through 4 consist of a layer A of H-mawag that has the function of absorbing most of the entering light and are preferably constructed in a way as has been described in 3.7. The layer $L_1$ is situated above the waterline. The layers $L_2$ through $L_{n+1}$ are situated below the waterline.

Due to the effect that inside the compartments 1 through 4 the water is heated more effectively than outside, the compartments 1 through 4 will start to float on the surrounding water if at least the condition that the temperature of the water in the compartments is higher than the temperature at which the water has its maximum density, is met. By choosing the cutoff wavelength of layer $L_i$, larger than that one of layer $L_{i-1}$, one can achieve a higher water temperature between the layers $L_i$ and $L_{i+1}$ than between the layers $L_{i+1}$ and $L_{i+2}$, with the effect that a stable construction of layers can be achieved, and the risk of capsizing for the compartments 1 through 4 due to the wash of the waves, can be prevented.

Figure 62:
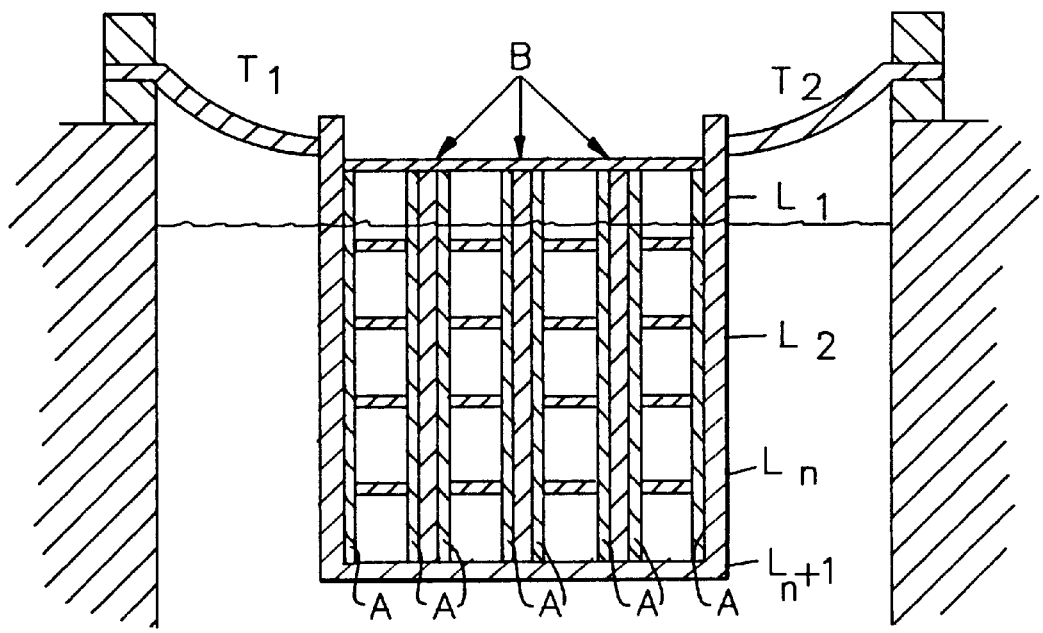
FIG. 62 shows, not to scale, a cross section of an installation for the heating of water and the storage of warm water.

The invention can be generalized by choosing the number of compartments different from 4, attaching the tethers $T_1$ and $T_2$ or one or more tethers to keep the floating element in its place, by fitting between the layers $L_1$ and $L_2$ one or more transport pipes for hot water and hot air, by fitting between the layers $L_n$ and $L_{n+1}$ one or more supply pipes for cold water. Allowing the layer $L_1$ to be below the waterline, by insulating the outer walls of the compartments with or without using H-mawag. The above mentioned supply and transport pipes are not shown in FIG. 62. The invention can also be generalized by not tethering the floating element to the shore as is shown in FIG. 62, but to tether it to the bottom or to one or more buoys, it is also possible to leave out the fixing material B which is situated between the compartments.

3.21. Solar Collector

With the help of H-mawag various types of solar collectors can be constructed. A number of them have been previously discussed, more or less. For instance the roll screen shown in FIG. 35 can, together with the behind laying space function as a solar collector. This is called a type I solar collector. Thereto, the number of the domains $h_n$ can be arbitrary (See 3.9.). At a perpendicular light incidence the smallest characteristic dimension of the H-mawag material has to be of the order of magnitude of 1.25 $\mu$m, in order to catch and to keep as much solar energy as possible.

At a perpendicular incidence of light at the catching of solar energy the smallest characteristic dimension of the H-mawag in the screen has to be of the order of magnitude of ¼ $\mu$m or smaller in order to achieve the highest temperature in a very well insulated space of which the insulating material has a low specific mass.

Figure 63:
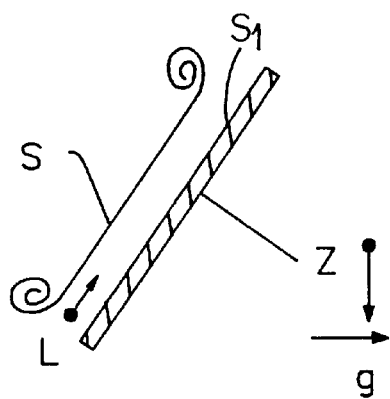
FIG. 63 shows a cross section of a solar collector.
Figure 64:
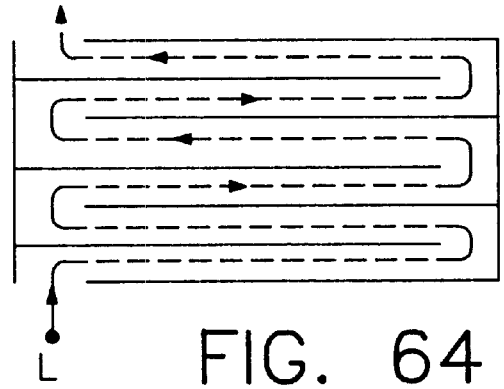
FIG. 64 shows, in longitudinal cross section, a variant of the solar collector shown in FIG. 63.
Figure 65:
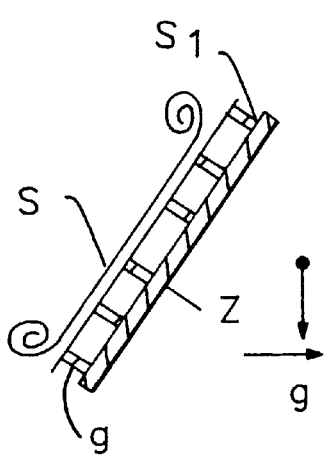
FIG. 65 is a cross section of the solar collector shown in FIG. 64.

The screen S shown in FIG. 35, with n being an arbitrary positive integer, can also be a part of a solar collector consisting of the s id screen with behind it and parallel to it a screen $S_1$ consisting of H-mawag that functions as absorbing material in one of the ways described in 3.7. This is a type II solar collector. In order to minimize back radiation effects the back-side Z of that absorbing material may or may not be constructed of H-mawag or another material with a small emissivity. This backside is preferably very well insulated thermically. A cross section of such a solar collector has been sketched in main lines in FIG. 63. Here, L indicates the direction of the air flow which is heated by the solar collector and $\vec{g}$ indicates the direction of the acceleration of the gravitation. A variant of the solar collector shown in FIG. 63 is shown in longitudinal section and in main lines in FIG. 64. This is a type III solar collector. At a constant volume of the space between the screens the resident time of a certain volume of air in the type III solar collector is longer than the one in a comparable type-II solar collector with the effect that the temperature of the air at the exit is higher than in the comparable solar collector of type II. This is due to the fact that the air in the solar collector is forced by the conductors G to move along a longer track. A cross section of the solar collector shown in FIG. 64 is shown in main lines in FIG. 65.

Type IV solar collector consists of a roll screen S of type I solar collector with behind m parallel screens of H-mawag. These screens transmit radiation and have dimensions such that the cutoff wavelength $\lambda_i$ of the i-th screen behind the roll screen is larger than that one of the i+1-th screen behind the roll screen Behind these parallel screens, a screen $S_2$ of H-mawag is situated which is aimed to absorb as much radiation as possible. That screen has been constructed in one of the ways that has been described at 3.7. In case m=o type II solar collector is identical with type IV solar collector. If m is even, then the cold air enters the solar collector at the lower side, while the hot air leaves the collector at the upper side.

Figure 66:
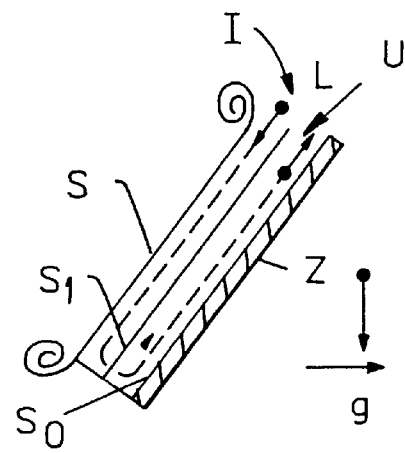
FIG. 66 is a cross section of another type of solar collector.
Figure 67:
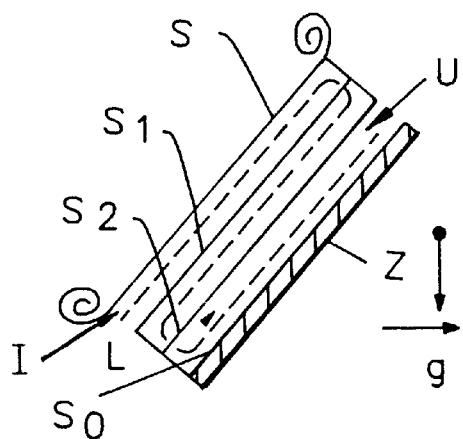
FIG. 67 is a cross section of a different solar collector of the same type as FIG. 66.

If m is odd, the cold air enters the collector at the upper side and leaves the collector at the lower side. In FIG. 66 in main lines a cross section of a solar collector of type IV is shown for the case m=1 and in FIG. 67 a cross section of the type IV solar collector is shown for the case m=2. In both cases the arrow near L indicates the direction of the air flows and symbolizes I the inlet and U the outlet of the solar collector.

Type V solar collector is identical with type IV solar collector on the understanding that here, just like in type III solar collector, horizontal, conductors G are mounted in order to increase the resident time in the solar collector. These conductors are situated between the screen S and the roll screen, between the screens S and between the absorbing screen $S_2$ and a screen S. The case m=o of type V solar collector is identical with type III solar collector.

Type VI solar collector consists of the floating-element shown in FIG. 62 or its generalization, with the understanding that the floating element is now situated in some liquids which do not or nearly do not mix and which are situated in such a way that the specific mass of the liquid between the layers $L_i$ and $L_{i+1}$ is smaller than the specific mass of the liquid between the layers $L_{i+1}$ and $L_{i+2}$. This way the layer structure of the liquids becomes stable and the temperature of the liquids decreases from below upwards.

Type VII solar collector consists of the thermo-element shown in FIG. 56 or one of its generalization.

Figure 68:
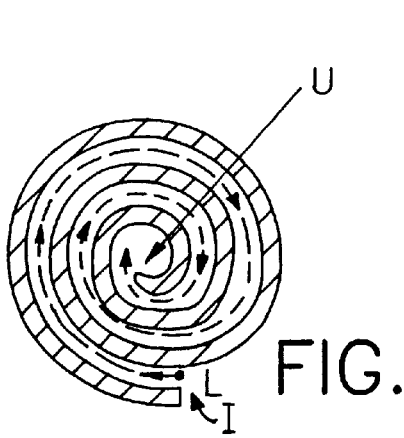
FIG. 68 is a longitudinal section of a solar collector using one of the floating-elements shown in FIG. 59.

Type IIX solar collector consists of one of the floating-elements $D_1$ and $D_2$ shown in FIG. 59 with the understanding that the heartline of that floating-element has a spiral shape while the inlet I of that floating-element is at a lower level than the outlet U. In main lines a longitudinal section of such a solar collector has been sketched in FIG. 68.

The above mentioned solar collectors are all so called internal solar collectors. In such solar collectors the air, or the gas or the liquid to be heated, comes in direct contact with the radiation to be catched.

The solar collectors described below are all, with exception of type VII so called external solar collectors. In these solar collectors the radiation to be catched does not come in direct contact with the air, or with the gas or with the liquid to be heated by the solar collector. External solar collectors have the advantage with respect to internal solar collectors that it is simpler to design them to be less corrosion sensitive than the internal solar collectors. Internal solar collectors have the disadvantage of requiring more material to be build and of having a longer response time.

Figure 75:
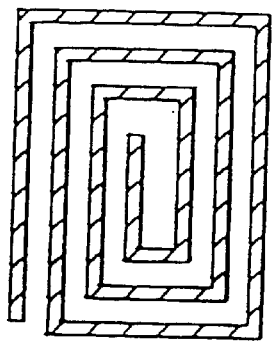
FIG. 75 is a longitudinal cross section of a heartline of a conductor through which air or gas to be heated flows in an external solar collector, where the heartline has a spiral shape of which part of the wall of the spiral coincides with a part of the wall of a balk.

External solar collectors can be made from internal solar collectors by taking the following two measures:

i) The canals through which the to be heated air or gas flowed have to be made gas tight and, if desired, constructed as such that it is possible to maintain very low pressures of gases which preferably do no corrode the walls of these canals. There one has to maintain that as little as possible of the entering radiation is absorbed in the medium situated in the cavities of the H-mawag or in the plate P behind the H-mawag.

ii) A conductor through which the air or gas to be heated flows, has to be mounted at the backside at the absorptionplate Z. The heartline of these conductor can, for instance, be straight, or zigzagging like the heartline of the airflow in FIG. 64, or have a spiral shape like the heartline of the airflow shown in FIG. 68, or have a spiral shape of which a part of the wall of the-spiral coincides with a part of the wall of a balk, as has been sketched in longitudinal section in FIG. 75.

Figure 74:
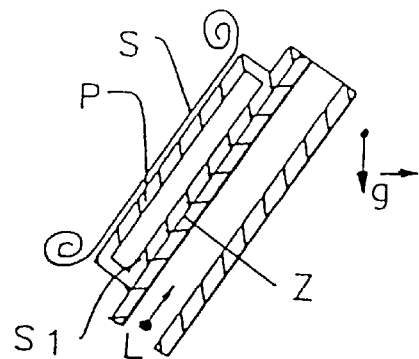
FIG. 74 shows a longitudinal cross section of an external solar collector.

FIG. 74 shows a longitudinal section of an external solar collector which arose by taking the above mentioned measures with the solar collector shown in FIG. 63.

Figure 76A:
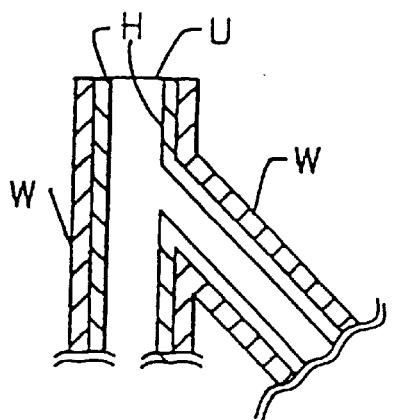
FIGS. 76A–76C show some examples of bifurcated solar chimneys in longitudinal section.
Figure 76B:
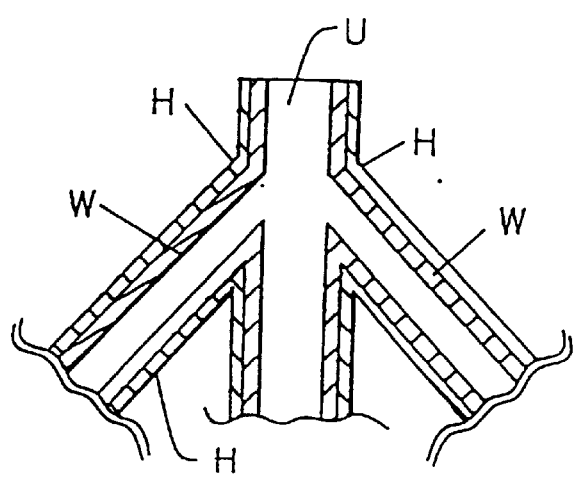
Figure 76C:
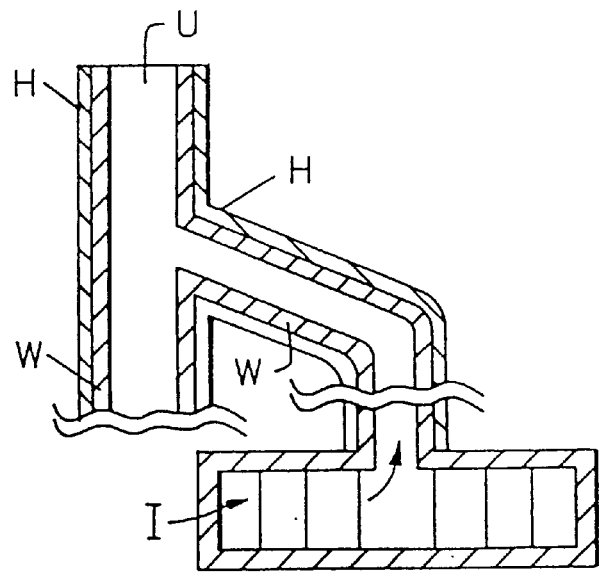

Finally two other types of solar collector will be described. The type IX solar collector is a so called solar chimney. Solar chimneys are known from literature. They are used for the airconditioning of kitchens and toilets. They consist of a hollow pipe of which the inner wall is indirectly heated by sunshine. This heat is partly absorbed by the air in the pipe with the effect that the chimney starts to draw in air. The said invention distinguishes itself from the conventional solar chimney by one or more of the following characteristics:

i) In the invention, H-mawag has been applied in such a way that it is aimed to absorb as much solar energy as possible (That kind of H-mawag has been described in 3.7.)

ii) The H-mawag used consists of various mutually insulated layers, as has been described in 3.9., of which the layer which is in direct thermal contact with the inner wall of the pipe, is constructed according to a method described in 3.7. and the other layers are aimed to reduce back radiation effects.

iii). The funnel is bifurcated. This allows for a lower placement of the top of the chimney then that of a conventional solar chimney while more draw is caused. Therefore this chimney is less sensitive to storms and lightning and can be constructed with a smaller diameter which between certain limits can cause a reduction of material costs, since at a smaller diameter of the funnel, a more favourable outline-quotient per meter can be achieved. Therefore it sometimes makes sense to provide one transport pipe of air or gases of one or more bifurcations which all function as a solar chimney and all have a diameter which is smaller than that one of the transportpipe. In FIG. 76 some examples of bifurcated solar chimneys are shown in a longitudinal section. There H symbolizes an absorbing layer of H-mawag. I is the inlet of the chimney and U the outlet.

Figure 77:
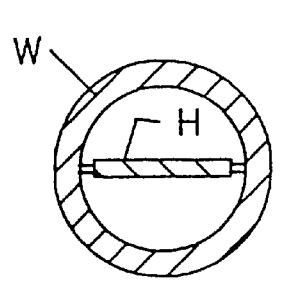
FIG. 77 shows a cross section of a solar chimney in which the absorbing H-mawag has been constructed an a flat strip and is situated in the center of a funnel of which the walls transmit as much sunlight as possible.
Figure 78:
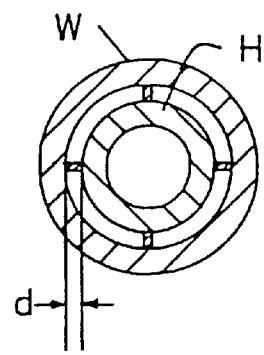
FIG. 78 shows, in a bended shape, strip H-mawag situated a constant distance from the wall of a solar chimney.
Figure 79:
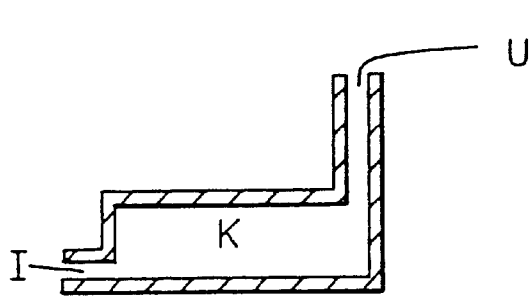
FIG. 79 shows a chimney connected with an oven chamber where, at the entrance, heated air or heated gasses of a nearly atmospheric pressure are let in which have not been heated in a solar collector. The inlet is positioned such that the heated air or heated gases leave the chimney at the outlet.

The wall of the chimney which is shown in FIG. 76.1 is practically transparent for solar radiation, contrary to the situation which is shown in FIG. 76.2.

iv) The absorbing H-mawag has been constructed as a flat strip and is situated in the centre of a funnel of which the walls transmit as much sunlight as possible. In FIG. 77 a cross section of such a situation has been sketched. This way the solar energy is used most efficiently. In a bended shape, the strip H-mawag can be situated at a constant distance d from the wall of the chimney W. A cross section of this is shown in FIG. 78.

v) Eventually the H-mawag in the solar chimney can also be constructed as a glowscreen, allowing the chimney to ventilate with the help of electricity, if the chimney does not draw with the help of solar energy, because of lack of sunlight. Apart from the airconditioning of kitchens and lavatories, solar chimneys can also be used either for the transport of hot air in an oven, furnace or kiln or for the transport of cold air in a refrigerator. In the former case the chimney is connected with an (oven)chamber, K. where, at the entrance I, heated air or heated gases of a nearly atmospheric pressure are let in which have or have not been heated in the solar collector. The inlet I is positioned such that the heated air or the heated gases finally leave the chimney at the outlet U (See FIG. 79). In the second case the draw of the chimney causes an airflow which is guided, for instance, over water. At the surface of that water a plate of H-mawag is situated such that the cavities are just filled with water. That water will vapourize with the effect that the airflow cools. The vapourization can be enhanced by choosing an electric conductor as a basic material for that H-mawag. That material can or cannot be put on a negative electric voltage. These variants are all included in the invention. The second case can be added by analogue to the first case on the understanding that, in this case at I, cold air or cold gases are let in.

Figure 80:
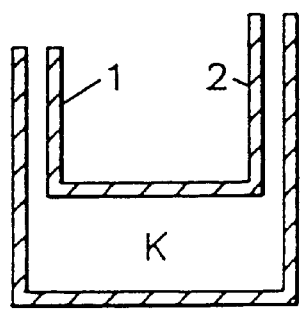
FIG. 80 is a longitudinal cross section in which two chimneys are used to supply a chamber with heated fresh air.

A second application consists of a piece of equipment which is aimed to supply the chamber K of heated fresh air. In this case, chimney 1 is used to heat fresh air and chimney 2 is used to draw that heated fresh air through the chamber outwards. Here the solar chimney have to be designed such that the draw in chimney 2 is greater than in chimney 1. Not on scale this situation has been sketched in longitudinal section in FIG. 80.

Type X solar collector consists of a number of thermo-elements described in 3.18 that have been connected in series. The special feature of these solar collectors is that the thermo-elements are partly connected such that the cold joint of thermo-element 1 is terrifically connected with the hot joint of thermo-element n+1 by a matter or gas that is a good heat conductor and also an electric insulator. If N thermo-elements are connected in such a way, the above mentioned connection does not apply for n=N. This way, as much solar energy as possible can be transformed by thermo-elements into electricity.

In a number of the above mentioned solar collectors the screen of H-mawag is preferably hanged with the help of tethers of stainless steel or carbon in order to minimize the number of undesired heat leaks to the wall of the solar collector.

The invention can be generalized in a large number of ways. For instance the angle between the direction of the acceleration of the gravitation and the direction in which the gas or the air flows in(to) the solar collector can be chosen differently then is indicated in the figures or can be made variable. It is through literature that the solar collector can be constructed in such a way that on every moment as much solar energy as possible will be catched. In a trivial way it is also possible to make composite solar collectors, thermo elements and spectral selective screens. These supply, for instance one or more of the following products: not air, hot gases, warm water, steam and electricity.

In this way solar energy can be generated for the highest possible economic profit. The solar collectors can be connected both in series or in parallel or partly in series and partly in parallel such that with the help of a connection apparatus, during a great part of the day, hot air or hot gases of constant temperature or electricity of constant voltage, can be supplied. This effect can be achieved with one solar collector, with the help of controllable roll screen S or with the help of valves in the conductors for the gases or air. The roll screen can be replaced by a rigid screen that qua hole pattern has been designed to be identical to a part of the roll screen.

The radiation selective screens which have been used in the invention can also be of a type which has been discussed in 3.9. In a trivial way, in order to minimize back radiation effects, these screens can also be used in solar collectors which are not included in the said invention. Some specific advantages of the current invention with respect to comparable conventional solar collectors are:

1) Small mass per $m^2$ sunlight catching area.
2) Shorter thermal response time. This causes the time interval to be, in which the supply conditions of hot air or of hot gases or of electricity of constant quality can be met, as long as possible.
3) At a given temperature of the absorption plate, there is, due to H-mawag, the least possible loss.
4) Due to good insulation with the help of H-mawag and the shorter response time, a higher process temperature can be achieved.
5) The possibility to bring them with the help of the floating-elements described in 3.20 or with balloons above the clouds in order that the catching of solar energy becomes independent of the weather conditions.

3.22) Ornaments

By applications of colour effects due to selective radiation, absorption and/or scattering at a material of the said kind.

3.23. Heatboxes

That is to say, light/heat transformation and storage of heat, for instance in behalf of chemical reactions at certain temperatures.

3.24 Information Carriers Constructed of n different kinds of waveguides with m different cutoff wavelengths by application of multi value logic, where at the bottom of these waveguides, if present, erasable information storage material can be placed of a kind known in the literature.

3.25 Transport Conductors

For communication purposes (p.24).

3.26 Wall Heating Elements (p.32)

3.27 Filters (p.38)

3.28 Propulsionsystems (p.$^{40}$)

3.29 Source of Synchrotron Radiation (p.55)

3.30 Lasers or Masers (p.56)

3.31 Flashlight Sources (p.57)

3.32 Flowthrough Catalysts (p.59)

3.33 Solar Chimney (p.75)

3.34 Vapourization Apparatuses (p.76)

3.35 Therapeutic Covering Material

That is to say light-heat transformation and/or thermal insulation of a living body in behalf of the curing of wounds and or the prevention or hindering of rheumatic pains.

3.36 Blankets

That is to say light-heat transformation and/or thermal insulation of a living body in behalf of preventing of cooling of that body (p.43).

3.37 Sleeping Bags

That is to say light-heat transformation and or thermal insulation of a living body in behalf of the prevention of cooling of that body.

3.38 Half Transmitting Mirrors (p.5)

3.39 Electrodes for Batteries (p.50)

3.40 Dust Filter

That is to say filter in behalf of the separation of various matters by a material that for a part consists of hollow wave guides for electromagnetic waves on which, if desired, either a positive or negative electric voltage can be put in behalve of the separation process (p.13).

It is worth noting that the concept cutoff wavelength and the therewith related phenomena are known from radar technology and the therein used frequencies of electromagnetic waves.

I claim:

1. An apparatus comprising at least one wave guide w for de Broglie waves and at least one particle p interacting with said wave guide wherein:

a) said particle p has momentum and energy and if said particle p is not a collectivity of identical particles and if it can be represented by an electromagnetic wave then it has a de Broglie wavelength $\lambda_b$ equal to the wavelength $\lambda$ of that electromagnetic wave;

b) said wave guide w having walls that define cross-sections $A_j$ that define both a cutoff wavelength for said wave guide w and circumferences $C(A_j)$ of the cross-sections $A_j$;

c) each of said circumferences $C(A_j)$ has either property I or property II:

property I provides that:
in every point of $C(A_j)$ a left tangent to $C(A_j)$ coincides with a right tangent to $C(A_j)$; and property II provides that:
there exists at least one point of $C(A_j)$ in which a left tangent to $C(A_j)$ does not coincide with a right tangent to $C(A_j)$;

d) each of said cross-sections $A_j$ has at least one characteristic dimension;

e) a characteristic dimension of a cross-section $A_j$ having property I is the distance between two points on $C(A_j)$ between which a particle transmitted by said wave guide w can move, provided:

(I) the tangents in said two points to the circumference $C(A_j)$ are parallel or anti-parallel to one another;

(ii) a straight line connecting said two points is normal to said tangents;

f) a characteristic dimension of a cross-section $A_j$ having property II is equal to a diameter of the largest circle that can be bonded by cross-section $A_j$;

g) there exists at least one set K of particles of the same kind;

h) in a case where at least one particle is transmitted by said wave guide w, in said wave guide w, in a region R between two cross-sections $A_1$ and $A_2$ of w, the energy density pu(R) of the particles being transmitted by said wave guide w that are elements of said set K or the average energy $\overline{U}(R)$ of the particles being transmitted by said wave guide w that are elements of said set K, is a function of an average value do of the smallest characteristic dimensions of the cross-sections $A_j$ situated between said two cross-sections, in such a way that $$\frac{\partial p_u(R)}{\partial d_0} \neq 0 \text{ or } \frac{\partial \overline{U}(R)}{\partial d_0} \neq 0$$

and, said average value $d_0$ has the property that in the domain there exists a factor y and an average value $d_{01}$ of the smallest characteristic dimension of wave guide w in the region R, so that $$\left| \frac{p_u(d_{01}\{1 - y \times 0.06\}) - p_u(d_{01})}{p_u(d_{01})} \right| \geq y \times 5 \times 10^{-2} \text{ or}$$

$$\left| \frac{(\overline{U}(R, d_{01}\{1 - y \times 0.06\}) - \overline{U}(R, d_{01})}{\overline{U}(R, d_{01})} \right| \geq y \times 5 \times 10^{-2}$$

hold, where y meets $0 < y \leq 1$;

I) said particle p has one or more of the following interactions with said wave guide w:

(I) transmission,
(ii) reflection,
(iii) emission,
(iv) absorption, and
(v) adsorption;

wherein, in cross-section, a subset of those of said areas $A_j$, which are situated on a surface parallel to an outer surface of said apparatus, comprise an approximately irregular pattern or an approximately regular pattern.

2. The apparatus of claim 1, wherein substantially all waveguides have substantially the same cutoff wavelength.

3. The apparatus of claim 1, wherein at least a portion of the outer surface of said apparatus is partly curved or partly flat.

4. The apparatus of claim 1 wherein said apparatus is a part of a wall between two spaces and there exists a pressure difference over said wall.

5. The apparatus of any one of claims 1–4 wherein said apparatus is put on an electric potential.

* * * * *